US012371925B2

(12) United States Patent
Baumgarte et al.

(10) Patent No.: US 12,371,925 B2
(45) **Date of Patent: *Jul. 29, 2025**

(54) INTERCHANGEABLE FUNCTIONAL ROSE INSERT

(71) Applicant: Schlage Lock Company LLC, Carmel, IN (US)

(72) Inventors: Joseph W. Baumgarte, Carmel, IN (US); Mitchell T. Barbon, Carmel, IN (US); Zachary P. Boomer, Indianapolis, IN (US); Joshua Long, Greenwood, IN (US); Daniel Langenberg, Zionsville, IN (US); Eric Halvorson, Fishers, IN (US); Jason Beck, Westfield, IN (US); Autumn A. Groleski, Noblesville, IN (US); Robert Martens, Carmel, IN (US); Robert Prostko, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,866

(22) Filed: Mar. 26, 2024

(65) Prior Publication Data

US 2024/0309675 A1 Sep. 19, 2024

Related U.S. Application Data

(63) Continuation of application No. 17/190,038, filed on Mar. 2, 2021, now Pat. No. 11,939,800.
(Continued)

(51) Int. Cl.
*E05B 9/00* (2006.01)
*E05B 15/02* (2006.01)
(Continued)

(52) U.S. Cl.
CPC .............. *E05B 9/002* (2013.01); *E05B 15/02* (2013.01); *E05B 41/00* (2013.01);
(Continued)

(58) Field of Classification Search
None
See application file for complete search history.

(56) References Cited

U.S. PATENT DOCUMENTS 8,371,141 B2 2/2013 Richmond
10,794,082 B1 10/2020 Watson et al.
(Continued)

FOREIGN PATENT DOCUMENTS

WO 2009158181 A1 12/2009
WO 2017075447 A1 5/2017

*Primary Examiner* — Thomas S McCormack
(74) *Attorney, Agent, or Firm* — Taft Stettinius & Hollister LLP

(57) ABSTRACT

A cover plate according to certain embodiments is configured for use with a mounting plate and a control system, and has a front side and a rear side opposite the front side. The cover plate includes a support substrate, a cover plate coupler, and an electronic device. The support substrate includes an opening sized and shaped to receive a spindle of a door hardware apparatus associated with the rose assembly. The cover plate coupler is configured to releasably couple with a mounting plate coupler of the mounting plate. The electronic device is mounted to the support substrate, and includes a first electrical connector accessible from the rear side of the cover plate and configured for electrical connection with a second electrical connector of the control system, and an electronic component electrically connected with the first electrical connector.

20 Claims, 11 Drawing Sheets

Related U.S. Application Data

(60) Provisional application No. 62/983,817, filed on Mar. 2, 2020.

(51) Int. Cl.
*E05B 41/00* (2006.01)
*E05B 47/00* (2006.01)

(52) U.S. Cl.
CPC ... *E05B 47/0001* (2013.01); *E05B 2047/0068* (2013.01); *E05B 2047/0069* (2013.01)

(56) References Cited

U.S. PATENT DOCUMENTS

| | | | | |
|---|---|---|---|---|
| 11,939,800 | B2 * | 3/2024 | Baumgarte | E05B 9/002 |
| 2010/0031713 | A1 | 2/2010 | Brown et al. | |
| 2018/0160498 | A1 | 6/2018 | Noeldner | |
| 2018/0223564 | A1 | 8/2018 | Roberts, III et al. | |
| 2018/0313113 | A1 | 11/2018 | Hickman et al. | |
| 2019/0360237 | A1 | 11/2019 | Roberts, III | |

* cited by examiner

INTERCHANGEABLE FUNCTIONAL ROSE INSERT

CROSS-REFERENCE TO RELATED APPLICATIONS

The present application is a continuation of U.S. patent application Ser. No. 17/190,038 filed Mar. 2, 2021 and issued as U.S. Pat. No. 11,939,800, which claims the benefit of U.S. Provisional Patent Application No. 62/983,817 filed Mar. 2, 2020, the contents of each application are incorporated by reference in their entirety.

TECHNICAL FIELD

The present disclosure generally relates to door trims, and more particularly but not exclusively relates to door hardware including functional trims with interchangeable plates that alter a function of the trim.

BACKGROUND

Door trims typically include a rose and a handle mounted to the rose. In addition to providing structural support for the handle, the rose also typically enhances the overall aesthetic of the trim. In conventional trims, however, should the user desire to change the aesthetic of the rose and/or a function of the door hardware, the user generally must replace the entire rose and/or other installed components of the door hardware, which can be costly and time-consuming. For these reasons among others, there remains a need for further improvements in this technological field.

SUMMARY

A cover plate according to certain embodiments is configured for use with a mounting plate and a control system, and has a front side and a rear side opposite the front side. The cover plate includes a support substrate, a cover plate coupler, and an electronic device. The support substrate includes an opening sized and shaped to receive a spindle of a door hardware apparatus associated with the rose assembly. The cover plate coupler is configured to releasably couple with a mounting plate coupler of the mounting plate. The electronic device is mounted to the support substrate, and includes a first electrical connector accessible from the rear side of the cover plate and configured for electrical connection with a second electrical connector of the control system, and an electronic component electrically connected with the first electrical connector. Further embodiments, forms, features, and aspects of the present application shall become apparent from the description and figures provided herewith.

DETAILED DESCRIPTION OF ILLUSTRATIVE EMBODIMENTS

Figure 1:
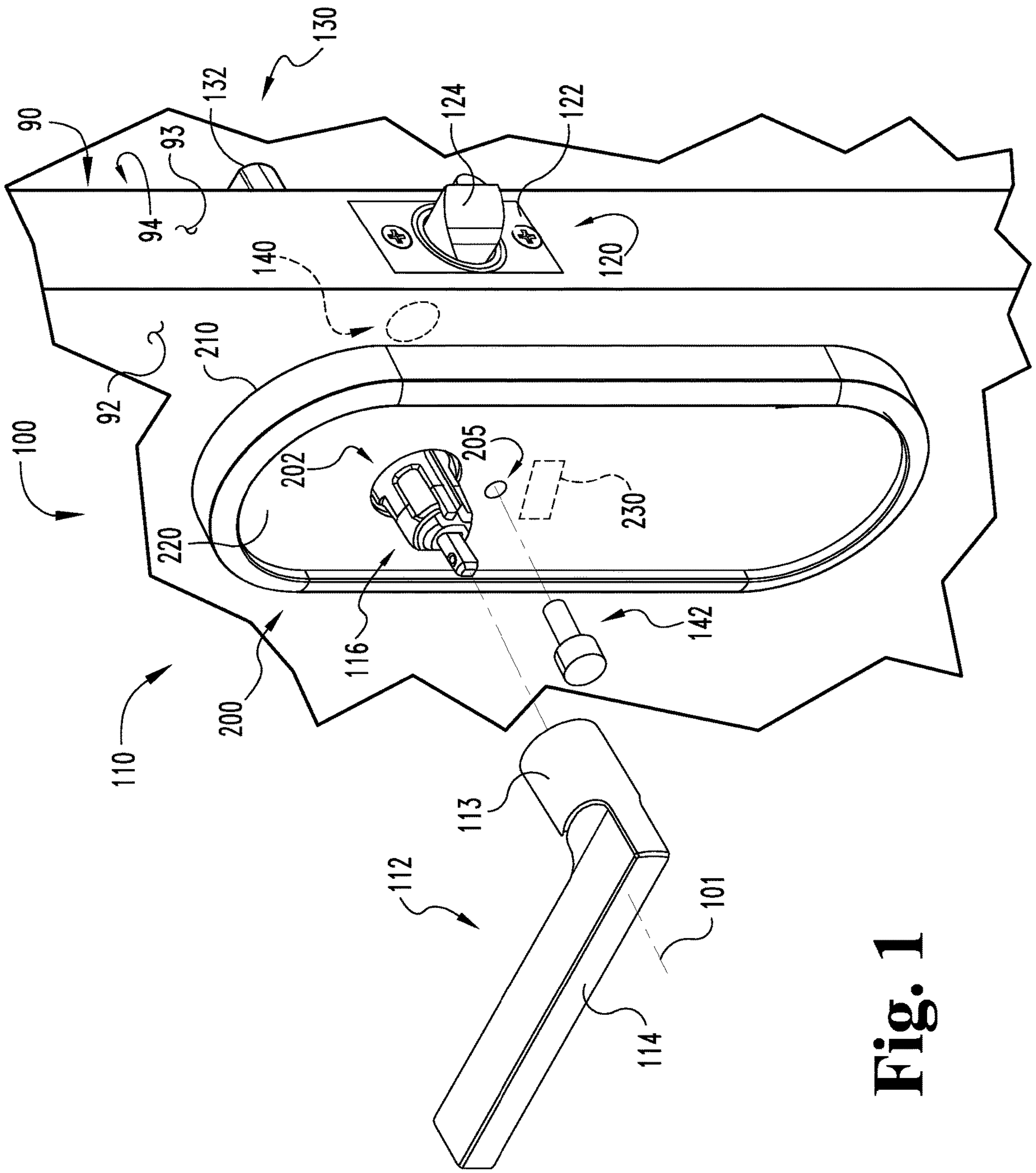
FIG. 1 is a partially exploded assembly view of a door hardware apparatus according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a door hardware apparatus 100 according to certain embodiments. The apparatus 100 is mounted to a door 90 including an inner or egress side 92, an outer or non-egress side 94, and a free edge 93 extending between and connecting the two sides 92, 94. The apparatus 100 includes a first trim assembly 110, and may further include a latch mechanism 120 actuated by the trim assembly 110 and/or a second trim assembly 130. In embodiments that include both the latch mechanism 120 and the second trim assembly 130, the apparatus 100 may further include a lock mechanism 140 operable to selectively prevent the second trim assembly 130 from operating the latch mechanism 120. As described herein, the door hardware apparatus 100 may further include one or more electronic components and/or one or more sensors.

The first trim assembly 110 generally includes a rose assembly 200 and a handle 112 mounted to the rose assembly 200 via a spindle 116. In the illustrated form, the handle 112 is provided as a lever handle, and generally includes a shank 113 extending along a primary axis 101 and a grip portion 114 extending laterally from the shank 113. It is also contemplated that the handle 112 may be provided in another form, such as that of a knob handle. In the illustrated form, the spindle 116 extends through an opening 202 of the rose assembly 200 and is rotatably mounted to the rose assembly 200 such that the primary axis 101 is a rotational axis of the handle 112. It is also contemplated that that the spindle 116 may have a fixed orientation, for example in embodiments in which the first trim assembly 110 is provided as a dummy trim.

In the illustrated form, the first trim assembly 110 is mounted to the egress side 92, and may alternatively be referred to as the interior trim assembly 110. It is also contemplated that a trim assembly including the rose assembly 200 may be mounted to the non-egress side 94 of the door 90, for example as described with reference to the second trim assembly 130.

In certain embodiments, the apparatus 100 may include a latch mechanism 120. In such forms, the latch mechanism 120 may include a housing 122 and a latchbolt 124 movably mounted to the housing 122. The latch mechanism 120 may be operably connected with the spindle 116 such that rotation of the spindle 116 causes retraction of the latchbolt 124. While the illustrated apparatus 100 includes the latch mechanism 120, it is also contemplated that the latch mechanism 120 may be omitted. For example, the trim assembly 110 may be provided as a dummy trim that is not connected to a latch mechanism. As another example, the latch mechanism 120 may be replaced by a roller latch.

In certain embodiments, the apparatus 100 may further include a second trim assembly 130. The second trim assembly 130 may be mounted to the non-egress side 94 of the door 90, and may alternatively be referred to as the outside trim assembly 130. The second trim assembly 130 may include a second handle 132, which may be mounted to a second rose assembly, such as one similar to the rose assembly 200 described herein. It is also contemplated that the second rose assembly may be of another form. In certain embodiments, the second handle 132 may be at least selectively operable to actuate the latch mechanism 120. In certain forms, the apparatus 100 may have a passage function in which the second handle 132 is always operable to actuate the latch mechanism 120. Additionally or alternatively, the apparatus 100 may have a privacy function in which the second handle 132 is selectively prevented from actuating the latch mechanism 120, for example by the lock mechanism 140.

In certain embodiments, such as those that include both the latch mechanism 120 and the second trim assembly 130, the apparatus 100 may further include a lock mechanism 140 operable to selectively prevent the handle 132 of the outside trim assembly 130 from actuating the latch mechanism 120. In certain embodiments, the lock mechanism 140 may include an actuator 142 accessible from the inner side 92 of the door 90. For example, the actuator 142 may project through a second opening 205 in the rose assembly 200. The actuator 142 may be movable between a first locking position and a second unlocking position to transition the lock mechanism 140 between a locking state and an unlocking state. In the locking state, the lock mechanism 140 prevents the outside handle 132 from actuating the latch mechanism 120. With the lock mechanism 140 in the unlocking state, the outside handle 132 is operable to actuate the latch mechanism 120. While other forms are contemplated, in the illustrated embodiments, the locking position is a depressed position, and the unlocking position is a projected position. Additionally, while the actuator 142 of the illustrated embodiment projects through the rose assembly 200, it is also contemplated that the actuator 142 may be mounted elsewhere, such as on the interior handle 112. Lock mechanisms that selectively prevent actuation of an outside handle are well known in the art, and need not be described in further detail herein.

In the illustrated embodiment, the door hardware apparatus 100 is provided in the form of a lockset, and includes an inside trim assembly 110, a latch mechanism 120, an outside trim assembly 130, and a locking mechanism 140, wherein each of the trim assemblies 110, 130 is at least selectively operable to actuate the latch mechanism 120. The lockset may, for example, be provided as a tubular lockset, a cylindrical lockset, a mortise lockset, or another form of lockset. It is also contemplated that one or more of the features described herein may be omitted. For example, the latch mechanism 120 may be omitted or replaced by a roller latch, and the trim assemblies 110, 130 may be provided as dummy trims in which the handle 112 has a fixed orientation. In certain embodiments, the door hardware apparatus 100 may instead be provided as an exit device assembly in which the inside trim assembly 110 is replaced by a pushbar exit device such that the outside trim assembly 130 is at least selectively operable to actuate the pushbar exit device.

Figure 2:
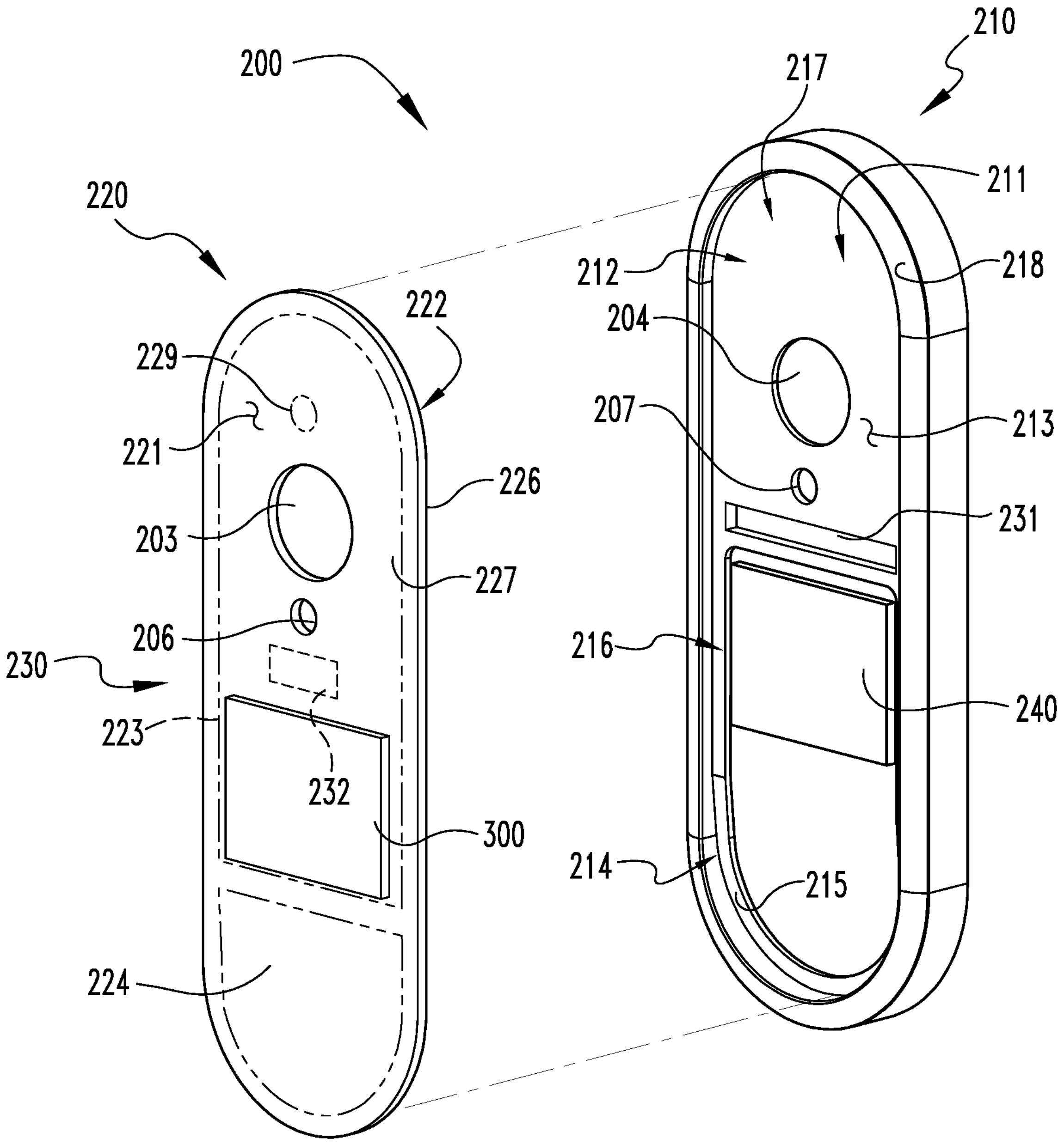
FIG. 2 is an exploded assembly view of a rose assembly according to certain embodiments.

With additional reference to FIG. 2, the rose assembly 200 generally includes a mounting plate 210 configured for mounting to the door 90, a cover plate 220 configured for mounting to the mounting plate 210, and a releasable coupler 230 releasably coupling the cover plate 220 to the mounting plate 210. In certain embodiments, a control system 240 is mounted within the mounting plate 210. In certain embodiments, the cover plate 220 includes an electronic device 300, which may be configured for connection with the control system 240. As described herein, the cover plate 220 can be easily replaced to change at least one function of the door hardware apparatus 100 and/or provide the door hardware apparatus 100 with at least one capability that the apparatus 100 lacks in the absence of the corresponding cover plate 220.

As noted above, the illustrated rose assembly 200 includes a first opening 202 and a second opening 205. The first opening 202 is defined in part by a first aperture 203 formed in the cover plate 220 and a second aperture 204 formed in the mounting plate 210. When the cover plate 220 is mounted to the mounting plate 210, the apertures 203, 204 are aligned such that the spindle 116 can extend through the spindle opening 202. Similarly, the second opening 205 is defined in part by a first aperture 206 formed in the cover plate 220 and a second aperture 207 formed in the mounting plate 210. When the cover plate 220 is mounted to the mounting plate 210, the apertures 206, 207 are aligned such that the actuator 142 can extend through the actuator opening 205 for connection with the internal components of the lock mechanism 140.

The mounting plate 210 generally includes a mounting area 211 sized and shaped to receive the cover plate 220, and may further include a raised perimeter or lip 218 surrounding the mounting area 211. In the illustrated form, the mounting area 211 is provided as a receiving space 217 that is defined at least in part by the lip 218. In other embodiments, a mounting area may not necessarily define a receiving space. As described herein, the lip 218 is one form of an alignment mechanism that aids in aligning the cover plate aperture(s) 203, 206 with the mounting plate aperture(s) 204, 207 to define the spindle opening 202 and the actuator opening 205. It is also contemplated that an alignment mechanism may take another form, such as that described below with reference to FIGS. 9-12.

Figure 3:
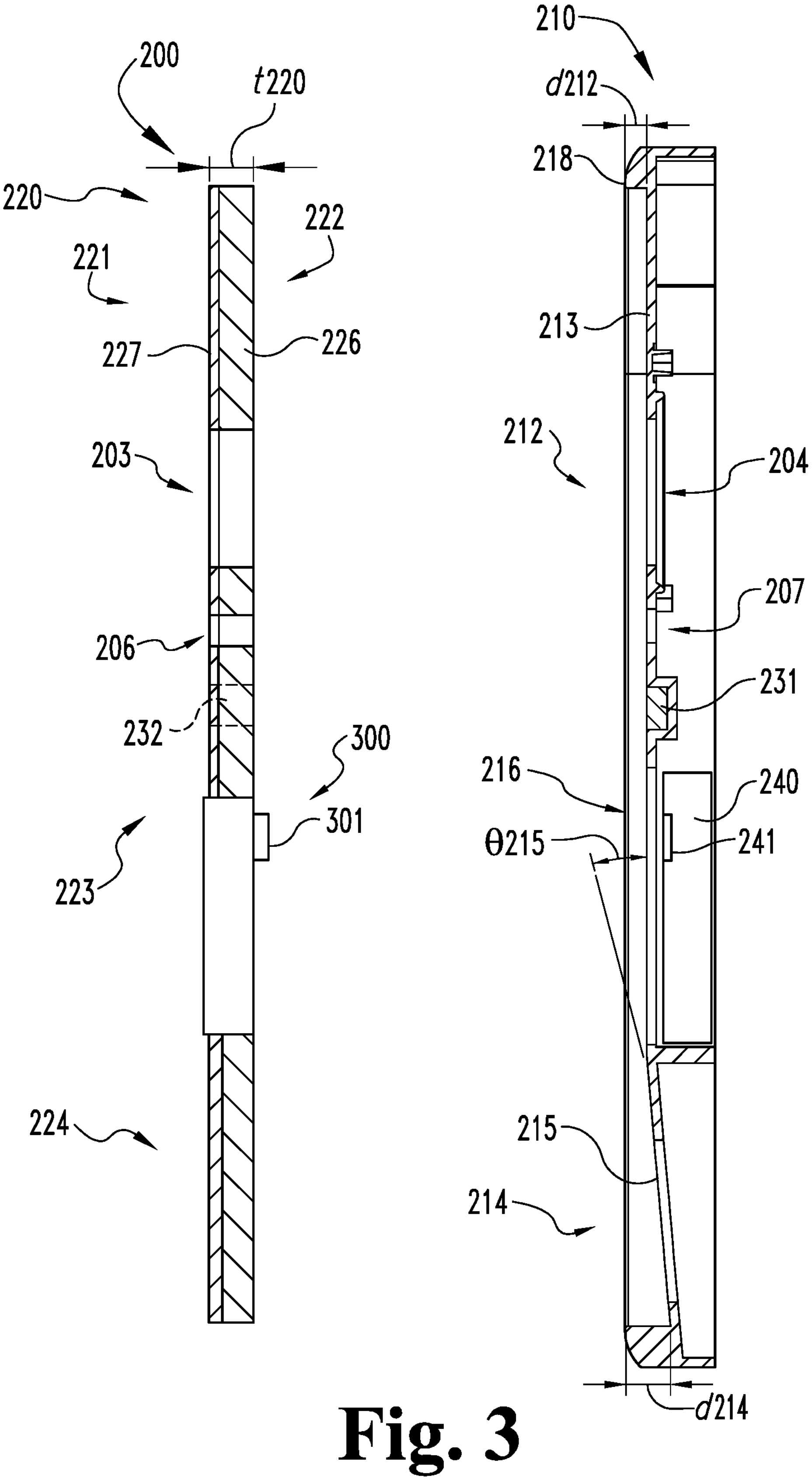
FIG. 3 is a cross-sectional illustration of the rose assembly illustrated in FIG. 2 while in a disassembled state.

With additional reference to FIG. 3, the illustrated mounting area 211 includes a primary receiving space 212 and a recessed portion 214 that aids in the mounting and/or removal of the cover plate 220. The primary receiving space 212 is defined in part by a first planar surface 213 that abuts a rear side of the cover plate 220 when the cover plate 220 is mounted to the mounting area 211. In the illustrated form, the recessed portion 214 is defined by a second planar surface 215 that extends at an oblique angle θ215 relative to the first planar surface 213. More particularly, the second planar surface 215 extends at the oblique angle θ215 in a distal or rearward direction that extends away from the cover plate 220 when the cover plate 220 is seated in the mounting area 211. While the second surface 215 defining the illustrated recessed portion 214 is planar, it is also contemplated that the second surface 215 may be provided as a curved surface (e.g., a convex or concave surface) that curves distally away from the first surface 213. Formed within the mounting plate 210 is an access opening 216 through which the control assembly 240 can be accessed by the electronic device 300 of the cover plate 220.

The primary receiving space 212 has a first depth d212, and the recessed portion 214 has a second depth d214. The first depth d212 is measured from the first planar surface 213 to the proximal face of the lip 218, and the second depth d214 is measured from the second planar surface 215 to the proximal face of the lip 218. As noted above, the second surface 215 extends distally away from the first surface 213; as a result, the second depth d214 is greater than the first depth d212. In certain embodiments, the first depth d212 may correspond to the thickness t220 of the cover plate 220 such that the outward-facing surface 221 of the cover plate 220 is substantially flush with the lip 218 when the cover plate 220 is seated in the receiving space 217. For example, the first depth d212 and the cover plate thickness t220 may be within 5 millimeters (mm) of one another. It is also contemplated that the outward-facing surface 221 and the lip 218 may not necessarily be substantially flush with one another. In certain embodiments, the maximum thickness t220 of the cover plate 220 is two centimeters or less. In certain embodiments, the maximum thickness t220 of the cover plate 220 is one centimeter or less.

The cover plate 220 is sized and shaped to be mounted to the mounting area 211, and in the illustrated form is sized and shaped to be seated in the receiving space 217. For example, the outer perimeter of the cover plate 220 may generally conform to the inner perimeter of the lip 218 such that the lip 218 is operable to circumferentially surround the cover plate 220. The cover plate 220 includes a front or outward-facing first surface 221 on a front or first side of the cover plate 22 and a rear or inward-facing second surface 222 on a rear side of the cover plate 220. When the cover plate 220 is seated in the mounting area 211 in the illustrated orientation, the first surface 221 is an outward- or proximal-facing front surface, and the second surface 222 is an inward- or distal-facing rear surface.

The cover plate 220 also includes a first region 223 and a second region 224. When the cover plate 220 is seated in the mounting area 211, the first region 223 is seated in the primary receiving space 212, and the second region 224 is received in or adjacent the recessed portion 214. In the illustrated form, the first region 223 includes the apertures 203, 206 and the electronic device 300, and is positioned above the second region 224. It is also contemplated that the cover plate 220 may have a different configuration, such as one in which the first region 223 is positioned below the second region 224. As described herein, at least one function of the door hardware apparatus 100 and/or the aesthetic appearance of the door hardware apparatus 100 may be customized by replacing the cover plate 220 with another cover plate of a different configuration.

In the illustrated form, the cover plate 220 includes a support substrate 226 and a decorative layer 227 mounted to the support substrate 226. The support substrate 226 is formed on the rear side of the cover plate 220 and may at least partially define the rear surface 222. The decorative layer 227 is formed on the front side of the cover plate 220 and at least partially defines the front surface 221. The decorative layer 227 may include at least one ornamental aspect 229, such as a design, a color, a finish, a texture, a material, indicia, a background, a foreground, an image, and/or a pattern. In certain embodiments, the decorative layer 227 may comprise a glass layer, such as a colored glass layer. In certain embodiments, the decorative layer 227 may comprise a laminate, a finish, a paint, and/or a printing.

The releasable coupler 230 selectively retains the cover plate 220 within the receiving space 217, and generally includes a first coupling portion 231 and a second coupling portion 232 configured to releasably couple with the first coupling portion 231. The mounting plate 210 includes the first coupling portion 231, which may alternatively be referred to as the mounting plate coupling portion 231. The cover plate 220 includes the second coupling portion 232, which may alternatively be referred to as the cover plate coupling portion 232. In the illustrated form, the releasable coupler 230 is provided as a magnetic coupler that includes at least one magnet. In certain embodiments, the first coupling portion 231 comprises a magnet, and the second coupling portion 232 comprises a ferrous material. For example, the support substrate 226 may be formed of steel or another ferrous material, and the second coupling portion 232 may be defined by the material of the plate 220. As another example, the cover plate 220 may be formed of wood, plastic, or another non-ferrous material, and may have mounted thereon or embedded therein a strip of ferrous material and/or a magnet. Additionally or alternatively, the second coupling portion 232 may comprise a magnet. In certain forms, both coupling portions 231, 232 may comprise magnets. As will be appreciated, such magnets may be oriented such that the magnetic forces developed between the magnets attract the coupling portions 231, 232 to one another when the cover plate 220 is seated in the receiving space 217.

While the illustrated releasable coupler 230 comprises at least one magnet, it is also contemplated that other releasable couplers may be used. For example, the releasable coupler 230 may include an adhesive, mating snap features, a hook-loop fastener, a hook-hook fastener, or other forms of releasable fastener that can be disengaged without requiring the use of a tool. It is also contemplated that a releasable fastener may be a tool-assisted releasable fastener, such as a screw, a bolt, or another threaded fastener.

Figure 4:
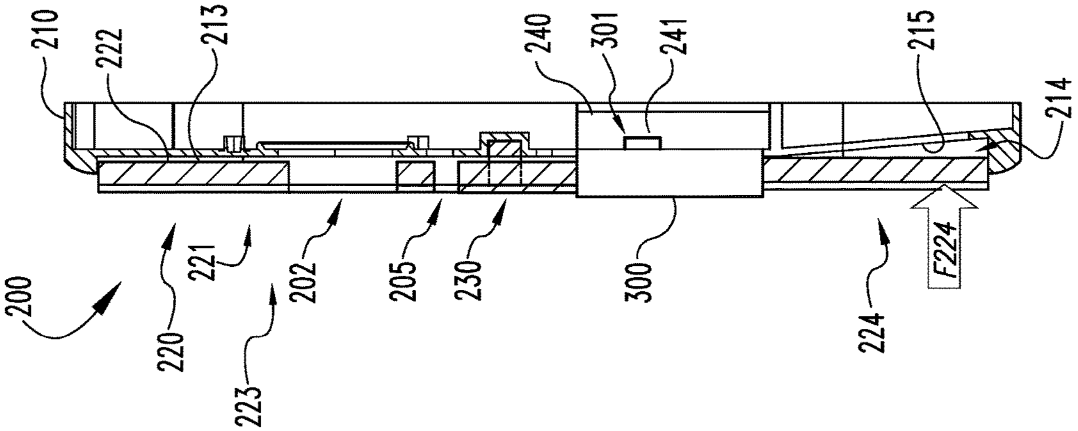
FIG. 4 is a cross-sectional illustration of the rose assembly illustrated in FIG. 2 while in an assembled state.

With additional reference to FIG. 4, when the cover plate 220 is installed to the mounting plate 210, the first region 223 is seated in the primary receiving space 212 such that the rear surface 222 of the first region 223 faces the first surface 213. Additionally, the second region 224 is adjacent to and/or received in the recessed portion 214 such that the rear surface 222 of the second region 224 faces and is spaced apart from the second surface 215. An electrical connector 241 of the control system 240 may be engaged with an electrical connector 301 of the electronic device 300 such that the control system 240 is in electrical communication with the electronic device 300, and the cover plate 220 is releasably retained in this seated position by the releasable coupler 230. When the handle 112 is installed to the spindle 116, the distal end of the shank 113 may abut or be in close proximity to the front surface 221 of the cover plate 220 to discourage or prevent removal of the cover plate 220 from the mounting area 211.

Figure 5:
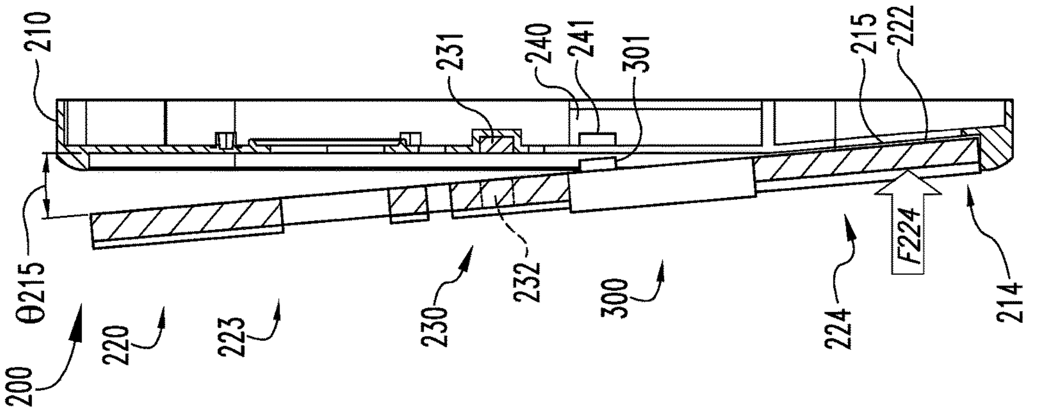
FIG. 5 is a cross-sectional illustration of the rose assembly illustrated in FIG. 2 while in a partially disassembled state.

With additional reference to FIG. 5, when a pushing force F224 is applied to the second region 224, the second region 224 enters the recessed portion 214. This causes the first region 223 to pivot out of the primary receiving space 212, thereby exposing the top edge of the cover plate 220 for grasping by the user. In the illustrated form, this pivoting causes the electrical connectors 241, 301 to disconnect from one another, and causes the coupling portions 231, 232 to release from engagement with one another. In other embodiments, such as those in which the releasable coupler comprises a tool-assisted fastener, the coupling portions 231, 232 may need to be released from engagement with one another prior to exerting the pushing force F224.

In the illustrated form, the recessed portion 214 is covered by the cover plate 220 when the cover plate 220 is installed to the mounting plate 210. It is also contemplated that a recessed portion may be formed elsewhere on the mounting plate 210. For example, a recessed portion may be formed at least partially in the lip 218 to aid a user in positioning their fingers behind the cover plate 220. In such forms, the user may exert a pulling force to remove the cover plate 220 from the mounting plate 210.

During installation of the cover plate 220 to the mounting plate 210, an alignment mechanism including the lip 218 facilitates the positioning of the cover plate 220 in the appropriate location and orientation relative to the mounting area 211. More particularly, the inner geometry of the lip 218 and the outer geometry of the cover plate 220 correspond to one another such that when the lip 218 surrounds the outer geometry of the cover plate, the aperture 203 of the cover plate 220 is aligned with the aperture 204 of the mounting plate 210, thereby enabling the spindle 116 to extend through the aligned apertures 203, 204. Similarly, the actuator-receiving aperture 206 is aligned with a corresponding aperture 207 formed in the mounting plate 210 such that the lock actuator 142 can extend through the aligned apertures 206, 207 for connection with the internal components of the lock mechanism 140.

Upon installation of the cover plate 220 to the mounting plate 210, the alignment mechanism including the lip 218 also aids in retaining the cover plate 220 in the proper location and orientation relative to the mounting area 211. More particularly, when the cover plate 220 is seated in the receiving space 212, the lip 218 is operable to engage the outer perimeter of the cover plate 220 to limit movement of the cover plate 220 in directions transverse to the primary axis 101. When the handle 112 is installed, the distal end of the shank 113 may face the cover plate 220 and limit movement of the cover plate 220 in a proximal direction along the primary axis 101.

Figure 6:
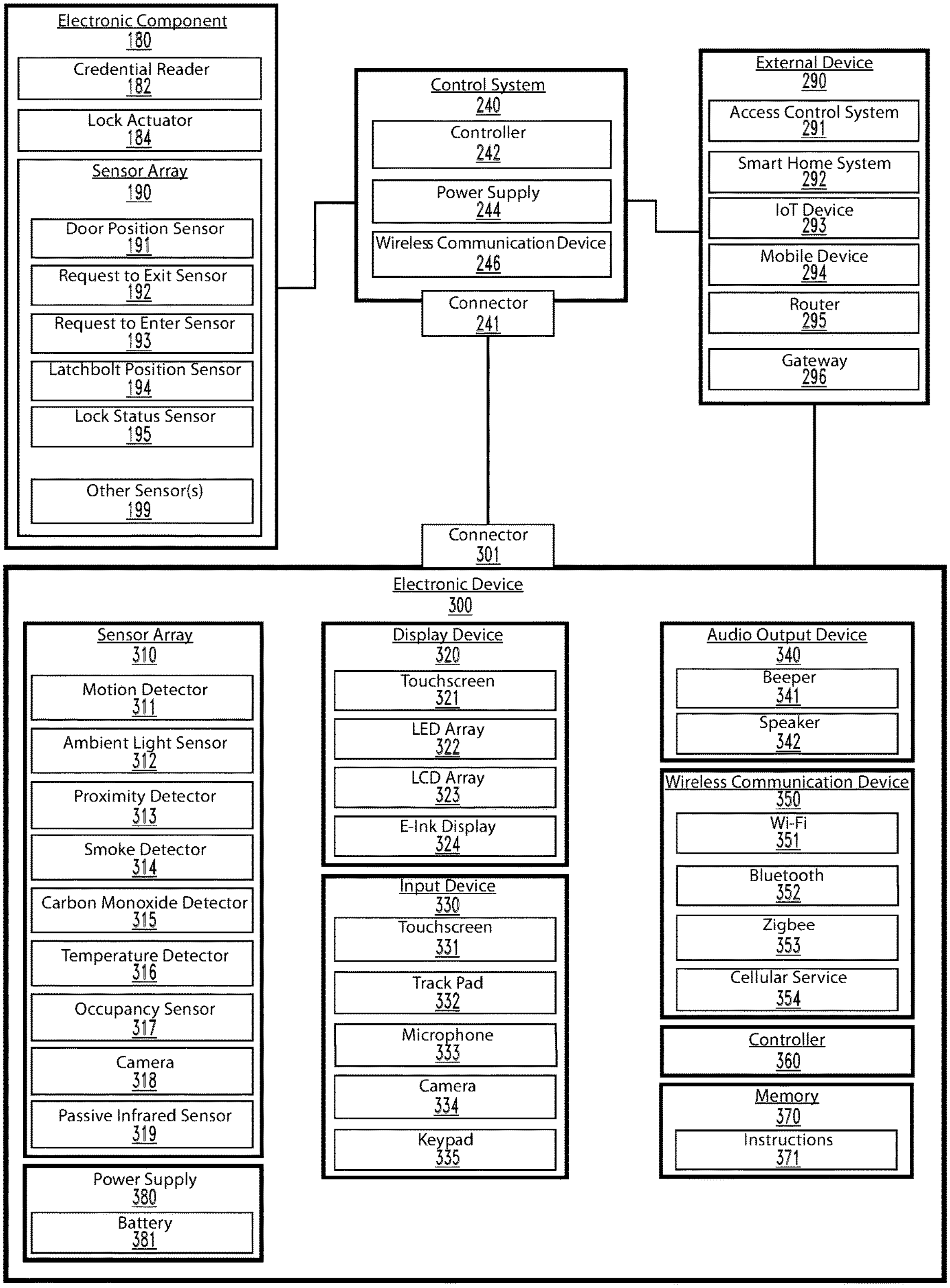
FIG. 6 is a schematic block diagram of a door hardware apparatus according to certain embodiments.

With additional reference to FIG. 6, in embodiments that include the control system 240, the control system 240 may include an electrical connector 241. The control system 240 may further include at least one of a controller 242, an onboard power supply 244 and/or a wireless communication device 246, one or more of which may be connected with the electrical connector 241. As described herein, the control system 240 may be in communication with one or more electronic components 180 of the door hardware apparatus 100, and the electrical connector 241 is configured to mate with an electrical connector 301 that may be provided to the electronic device 300 to place the control system 240 in communication with the electronic device 300 of the cover plate 220. When so connected, the controller 242 may be operable to control operation of the electronic device 300 to perform one or more functions and/or place the electronic device 300 in communication with the electronic component(s) 180. In embodiments in which the control system 240 does not include the controller 242, the control system 240 may simply provide power to the electronic device 300 and/or place the electronic device in communication with the door hardware components 180. In embodiments in which the control system 240 includes the onboard power supply 244, the onboard power supply 244 may, for example, take the form of one or more batteries. Additionally or alternatively, the control system 240 may be configured for connection to line power.

In embodiments in which the control system 240 includes the wireless communication device 246, the wireless communication device 246 may facilitate communication between the control system 240 and an external device 290, such as an access control system 291, a smart home system 292, an Internet of Things (IoT) device 293, a mobile device 294, a router 295, and/or a gateway 296. The wireless communication device 246 may be configured to communicate wirelessly via one or more wireless communication protocols, such as Bluetooth, Bluetooth Low Energy (BLE), Wi-Fi, Zigbee, and/or other wireless communication protocols. Additionally or alternatively, the control system 240 may be in communication with the external device 290 via a wired connection. It is also contemplated that the control system 240 may not necessarily be connected to an external device 290, for example in embodiments in which the door hardware apparatus 100 is provided as a standalone door hardware apparatus.

As noted above, the door hardware apparatus 100 may include one or more electronic components 180. Such electronic components 180 may, for example, include one or more of a credential reader 182, a lock actuator 184, and/or a sensor array 190 including at least one sensor. In certain embodiments, the electronic components of the control system 240 (e.g., the controller 242, the power supple 244, and/or the wireless communication device 246) may be considered to be electronic components of the door hardware apparatus 100.

In embodiments that include the credential reader 182, the credential reader 182 may be configured to provide the control system 240 with information related to a presented credential. The credential reader 182 may, for example, comprise a card reader, a biometric credential reader, a fob reader, a mobile device reader, or another form of credential reader. In embodiments that include the lock actuator 184, the lock actuator 184 may be provided as an electromechanical actuator (e.g., a solenoid, rotary motor, or linear motor) operable to transition the locking device 140 between its locked and unlocked states based upon commands received from the control system 240. As one example, the control system 240 may cause the lock actuator 184 to transition the lock mechanism 140 from its locked state to its unlocked state in response to a valid credential being presented to the credential reader 182.

In embodiments in which the door hardware apparatus 100 includes the sensor array 190, the sensor array 190 includes at least one sensor. Each sensor is operable to sense at least one condition, one or more of which may relate to operation of the door hardware apparatus 100 and/or the door 90. In certain embodiments, the sensor array 190 may include one or more of the following: a door position sensor 191 operable to sense the open/closed position of the door 90; a request to exit sensor 192 configured to sense when a user has actuated the interior handle 112 in an attempt to open the door 90; a request to enter sensor 193 configured to sense when a user has actuated the exterior handle 132 in an attempt to open the door 90; a latchbolt position sensor 194 operable to sense the extended/retracted position of the latchbolt 124; a lock status sensor 195 configured to sense the locked/unlocked state of the lock mechanism 140. The sensor array 190 may include additional or alternative sensors 199 operable to sense at least one condition of the door hardware apparatus 100, such as a deadbolt position sensor operable to sense the extended/retracted position of a deadbolt of the door hardware apparatus 100. In certain embodiments, one or more of the sensors may, for example, include one or more of the following: a microswitch; an optical switch; a magnetic sensor such as a Hall effect sensor, a magnetometer, or a reed switch; a potentiometer. In certain embodiments, the sensor array 190 may include a temperature sensor and/or a passive infrared sensor, and may further include one or more lenses that aid such sensors in detecting changes in temperature and/or improve the fidelity of the sensor.

The electronic device 300 includes at least one electronic component. In certain embodiments, such as those in which the electrical features and/or intelligence of the rose assembly 200 is distributed between the cover plate 220 and the control system 240, the at least one electronic component is connected with an electrical connector 301 configured to mate with the electrical connector 241 of the control system 240. It is also contemplated that the electrical components of the rose assembly 200 may be consolidated within the cover plate 220. In such forms, the electrical connector 301 and/or the electrical connector 241 may be omitted.

In certain embodiments, the at least one electronic component of the cover plate electronic device 300 comprises a sensor array 310 including at least one sensor. In certain embodiments, the at least one electronic component comprises a display device 320 operable to generate a display visible to a user. In certain embodiments, the at least one electronic component comprises an input device 330 operable to receive input from a user. In certain embodiments, the at least one electronic component comprises an audio output device 340 operable to provide audio feedback to a user. In certain embodiments, the at least one electronic component comprises a wireless communication device 350 that facilitates communication with an external device 290. In certain embodiments, the at least one electronic component comprises a controller 360 operable to control operation of at least a portion of the electronic device 300 and/or the door hardware apparatus 100. In certain embodiments, the at least one electronic component comprises a memory 370 for storing digital information. In certain embodiments, the electronic device 300 comprises an onboard power supply 380.

In certain embodiments, the electronic device 300 may include a sensor array 310 including at least one sensor. In certain embodiments, the sensor array 310 may include a motion detector 311 operable to detect motion in the vicinity of the rose assembly 200. In certain embodiments, the sensor array 310 may include an ambient light sensor 312 operable to detect a level of ambient light in the area that the rose assembly 200 faces. In certain embodiments, the sensor array 310 may include a proximity detector 313 operable to detect the approach of a user. In certain embodiments, the sensor array 310 may include a smoke detector 314 configured to detect the presence of smoke in the vicinity of the rose assembly 200. In certain embodiments, the sensor array 310 may include a carbon monoxide detector 315 operable to detect the presence of carbon monoxide in the vicinity of the rose assembly 200. In certain embodiments, the sensor array 310 may include a temperature sensor 316 configured to sense the temperature within the area that the rose assembly 200 faces. In certain embodiments, the sensor array 310 may include an occupancy sensor 317 configured to detect the presence of a user within the area that the rose assembly 200 faces. In certain embodiments, the sensor array 310 may include a camera 318. In certain embodiments, the sensor array 310 may include a passive infrared sensor 319. It should be appreciated that the sensors 311-319 listed herein are exemplary only, and should not be construed as an exhaustive or exclusive listing of the sensors that may be provided to the sensor array 310. For example, the sensor array 310 may include a lock status sensor 195 that sense the locked/unlocked state of the lock mechanism 140 by sensing the depressed/projected position of the lock actuator 142.

In certain embodiments, the electronic device 300 may include a display device 320 operable to visually display information and/or other items to a user. In certain embodiments, the display device 320 may include a touchscreen 321. In certain embodiments, the display device 320 may include a light emitting diode (LED) array 322. In certain embodiments, the display device 320 may include a liquid crystal display (LCD) array 323. In certain embodiments, the display device 320 may include an electronic ink display 324. As described herein, the display device 320 may display information and/or other items under the control of the control system 240 and/or the controller 360.

In certain embodiments, the electronic device 300 may include an input device 330 operable to receive information from a user. In certain embodiments, the input device 330 may include a touchscreen input 331. In certain embodiments, the input device 330 may include a track pad 332. In certain embodiments, the input device 330 may include a microphone 333. In certain embodiments, the input device 330 may include a camera 334. In certain embodiments, the input device 330 may include a keypad 335. As described herein, the input device 330 is configured to receive a user input and to provide information related to the user input to the control system 240 and/or the controller 360.

In certain embodiments, the electronic device 300 may include an audio output device 340 operable to generate audio output. In certain embodiments, the audio output device 340 may include a buzzer or beeper 341. In certain embodiments, the audio output device 340 may include a speaker 342. As described herein, the audio output device 340 may generate audio output under the control of the control system 240 and/or the controller 360.

In certain embodiments, the electronic device 300 may include one or more wireless communication devices 350 configured to facilitate communication with an external device 290. In certain embodiments, the wireless communication device(s) 350 may include a Wi-Fi communication device 351. In certain embodiments, the wireless communication device(s) 350 may include a Bluetooth communication device 352 such as a Bluetooth Low Energy (BLE) communication device. In certain embodiments, the wireless communication device(s) 350 may include a Zigbee communication device 353. In certain embodiments, the wireless communication device(s) 350 may include a cellular service communication device 354. It is also contemplated that the wireless communication device(s) 350 may include other forms of wireless communication device not specifically illustrated in FIG. 6.

In certain embodiments, the electronic device 300 may include a controller 360 operable to control operation of one or more components of the electronic device 300 and/or one or more electronic components 180 of the door lock apparatus 100. For example, should the control system 240 lack the controller 242, the electronic control of the door lock actuator 184 may be provided by the controller 360 of the electronic device 300.

In certain embodiments, the electronic device 300 may include memory 370 operable to store information. The memory 370 is provided as a non-transitory computer readable medium having stored thereon information. For example, the memory 370 may have stored thereon instructions 371 relating to the operation of one or more electronic components of the electronic device 300. Such instructions 371 may be provided such that the instructions, when executed by a controller (e.g., the controller 242 and/or the controller 360) cause the controller to operate the electronic device 300. As described herein, such information and/or instructions 371 may be utilized by the control system 240 and/or the controller 360 to control operation of the electronic device 300.

In certain embodiments, the electronic device 300 may include a power supply 380 operable to provide electrical power to at least one other component of the electronic device 300. In certain forms, the power supply 380 may comprise at least one battery 381. The at least one battery 381 may be provided in any of a number of forms, such as coin cell batteries, pillar batteries (e.g., AA, AAA), 9-volt batteries, or other forms of battery. It is also contemplated that the power supply 380 may include another form of energy storage device, such as a supercapacitor.

Figure 7:
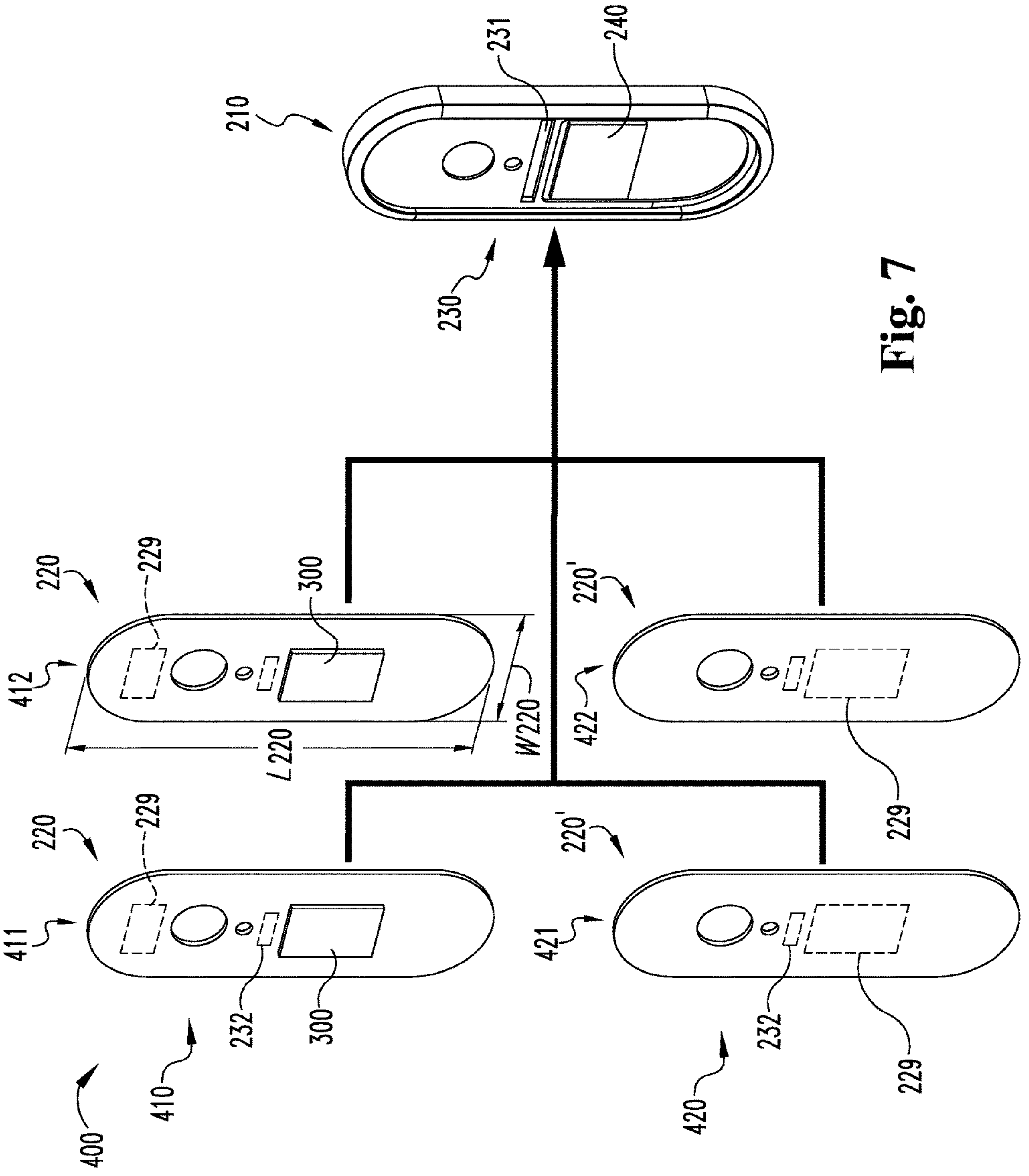
FIG. 7 illustrates a product line according to certain embodiments.

With additional reference to FIG. 7, illustrated therein is a system or product line 400 according to certain embodiments, which may be utilized to create a rose assembly 200 along the lines set forth above. The rose assembly product line 400 includes the mounting plate 210, a plurality of cover plates 220, the releasable coupler 230, and the control system 240. In the interest of conciseness, the following description of the rose assembly product line 400 focuses primarily on elements and features that were not specifically described above with reference to the rose assembly 200.

The illustrated product line 400 includes a plurality of cover plates 220 that can be interchangeably mounted to the mounting plate 210. The product line 400 includes at least one electronic cover plate configuration 410, each of which includes a cover plate 220 including an electronic device 300. In the illustrated form, the at least one electronic cover plate configuration 410 includes a plurality of electronic cover plate configurations 411, 412. The product line 400 may further include at least one non-electronic cover plate configuration 420, each of which includes at least one cover plate 220' that does not include an electronic device 300. In the illustrated form, the at least one non-electronic configuration 420 includes a plurality of non-electronic cover plate configurations 421, 422. As described herein, each of the cover plate configurations in the product line 400 differs from each other cover plate configuration in the product line 400 in at least one aspect.

Each cover plate 220 in the product line 400 has a longitudinal length L220, a lateral width w220 less than the length L220, and a transverse thickness t220 (FIG. 3) less than the width w220. Each cover plate 220 also has an outer geometry or outer perimeter that defines the length L220 and the width w220. The outer geometries of the cover plates 220 match one another, and correspond to the geometry of the mounting area 211. In the illustrated form, the outer geometries of the cover plates 220 are provided in the form of a racetrack including two parallel edges and two curved or arcuate edges, wherein the parallel edges extend between and connect opposite ends of the curved or arcuate edges. It is also contemplated that the outer geometries of the cover plates 220 may take another form, such as that of a rectangle with curved corners, or other geometries.

The outer geometries of the cover plates 220 match the geometry of the receiving space 217, which in the illustrated form is defined by the inner geometry of the lip 218. Thus, each cover plate 220 of the illustrated embodiment has the same length L220 and the same width w220. In certain embodiments, the thicknesses t220 of the cover plates 220 may be the same. It is also contemplated that the thicknesses t220 of two or more cover plates 220 may differ, for example due to the inclusion of different configurations of the electronic device 300 or omission of such electronic devices 300. In certain embodiments, the maximum thickness of one or more cover plates 220 is less than one centimeter. In certain embodiments, such as those in which the electronic device 300 is more bulky, the maximum thickness of a cover plate may be three centimeters or less. In certain embodiments, the maximum thickness of a cover plate may be two centimeters or less.

Each of the at least one electronic cover plate configurations 410 includes a corresponding and respective cover plate 220 including a corresponding and respective electronic device 300. As noted above, one or more of the electronic devices 300 may include an electrical connector 301 configured to mate with the electrical connector 241 of the control system 240. The first electronic cover plate configuration 411 and the second electronic cover plate configuration 412 differ in at least one aspect. In certain embodiments, the at least one aspect by which the cover plate configurations 411, 412 differ includes an aesthetic appearance of the cover plates 220, for example as described below with reference to the non-electronic cover plate family 420. Additionally or alternatively, the at least one aspect in which the cover plates configurations 411, 412 differ may include the configuration of the electronic devices 300. By way of example, the electronic device 300 of the first electronic cover plate configuration 411 may include an ambient light sensor 312, and the electronic device 300 of the second electronic cover plate configuration 412 may include a proximity detector 313 in place of the ambient light sensor 312. In such an example, the first configuration 411 may include memory 370 including information and/or instructions 371 relating to operation of the ambient light sensor 312, and the second configuration 412 may include memory 370 including information and/or instructions 371 relating to operation of the proximity detector 313.

In certain embodiments, the product line 400 may include at least one non-electronic cover plate configuration 420 including at least one cover plate 220' that does not include an electronic device 300, and in the illustrated form includes a plurality of non-electronic cover plate configurations 421, 422. Each non-electronic cover plate configuration 420 includes a cover plate 220 having an ornamental aspect 229, and the ornamental aspects 229 differ from one configuration to the next. Examples of an ornamental aspect 229 that may differ between configurations include, but are not limited to, a design, a color, a finish, a texture, a material, indicia, a background, a foreground, an image, and/or a pattern. While not specifically illustrated in FIG. 7, it should be appreciated that one or more of the electronic cover plate configurations 410 may include ornamental aspects, which may be similar to or different from the ornamental aspects 229 provided by the non-electronic cover plate configurations 420.

Each cover plate 220 includes a corresponding cover plate coupler 232 configured to releasably engage the mounting plate coupler 231. In certain embodiments, the cover plate coupler 232 of one cover plate configuration may be substantially similar to the cover plate coupler 232 of another cover plate configuration. It is also contemplated that the cover plate coupler 232 of one cover plate configuration may be different from the cover plate coupler 232 of another cover plate configuration. As one example, in embodiments in which the mounting plate coupler 231 comprises a magnet, a cover plate 220 of a first configuration may be formed of a ferrous material, and the cover plate coupler 232 of such a configuration may be defined by such ferrous material. Should the cover plate 220 of another configuration be formed of a non-ferrous material, the cover plate coupler 232 of such other configuration may be provided as a magnet or a strip of ferrous material.

As described herein, each of the electronic cover plate configurations 410 is configured to provide the door hardware apparatus 100 with at least one capability or function that the door hardware apparatus 100 lacks when a cover plate 220 of the corresponding configuration 410 is not installed to the mounting plate 210. Certain illustrative examples of the functions and capabilities that may be provided by one or more of electronic cover plate configurations 410 will now be described.

In certain embodiments, at least one of the electronic cover plate configurations 410 is configured to provide an indication of the locked/unlocked state of the door 90. Such a configuration may, for example, be configured for use with a door hardware apparatus 100 including a lock mechanism 140 and a lock status sensor 195. In such forms, the control system 240 and/or the controller 360 may cause the display device 320 to display information relating to the locked/unlocked state of the door 90. For example, the display device 320 may display a first indicium (e.g., a first color and/or a first symbol) when the lock mechanism 140 is in its locked state, thereby indicating that the door 90 is locked. Additionally or alternatively, the display device 320 may display a second indicium (e.g., a second color and/or a second symbol) when the lock mechanism 140 is in its unlocked state, thereby indicating that the door 90 is unlocked. Such an embodiment of the cover plate 220 may, for example, be useful on doors 90 positioned at restrooms.

In certain embodiments, at least one of the electronic cover plate configurations 410 is configured to indicate to users a path to safety, such as during emergency conditions. The directions may, for example, be provided to the electronic device 300 by the external device 290 via a Bluetooth chip 352, such as a BLE communication device. Should the emergency condition be a fire condition, the information provided to the electronic device 300 may cause the display device 320 to direct the users to an exit. Should the emergency condition be a severe weather condition, the information provided to the electronic device 300 may cause the display device 320 to direct the users to a storm shelter within the building. Should the emergency condition be a lockdown condition, the information provided to the electronic device 300 may cause the display device 320 to direct the users to stay put and lock the door 90.

In certain embodiments, at least one of the electronic cover plate configurations 410 is configured to connect to a mobile device 294, for example via the Bluetooth chip 352. For example, the instructions 371, when executed by the control system 240 and/or the controller 360, may cause the control system 240 and/or the controller 360 to pair with the mobile device 294 via a Bluetooth connection when the mobile device 294 is in range of the electronic device 300, and to authenticate the mobile device 294 to ensure that the user of the mobile device 294 is authorized to unlock the door 90. Upon pairing and authentication, the user may signal to the mobile device 294 his or her intent to unlock the door 90, for example by knocking on the mobile device 294. In response to sensing the knocking, the mobile device 294 may transmit to the electronic device 300 a request to unlock the door 90. In response to such a request by an authorized mobile device 294, the control system 240 and/or the controller 360 may drive the electromechanical lock actuator 184 to transition the lock mechanism 140 to its unlocked state, thereby unlocking the door 90 for the authorized user.

In certain embodiments, at least one of the electronic cover plate configurations 410 is configured to be mounted to a door 90 of a hotel room, and to indicate to service personnel the user's desire for privacy or cleaning services. For example, the display device 320 may selectively display first indicia identifying the user's desire for privacy, and/or may selectively display second indicia identifying the user's desire for cleaning services. The display device 320 may, for example, transition between displaying the first indicia and the second indicia based upon information received via the input device 330.

In certain embodiments, at least one of the electronic cover plate configurations 410 is configured to indicate occupancy of a room. For example, a first cover plate configuration 411 installed to the interior side 92 of the door 90 may include an occupancy sensor 317, and a second cover plate configuration 412 installed to the exterior side 94 of the door 90 may include a display device 320. In such forms, the control system 240 and/or the controller 360 may cause the display device 320 of the second cover plate configuration 412 to display information relating to the occupancy of the room based upon information received from the occupancy sensor 317 of the first cover plate configuration 411.

In certain embodiments, at least one of the electronic cover plate configurations 410 is configured to provide an alert related to a hazardous condition in the vicinity of the rose assembly 200 to which the cover plate 220 is installed. As one example, such a cover plate configuration may include a smoke detector 314, and may provide the alert in response to detecting smoke via the smoke detector 314. Additionally or alternatively, such a cover plate configuration may include a carbon monoxide detector 315, and may provide the alert in response to detecting a threshold level of carbon monoxide via the carbon monoxide detector 315. The alert provided may, for example, involve activating the beeper 341 and/or the speaker 342 to provide an audible alert related to the hazardous condition. In certain embodiments, the alert may be provided to the external device 290, for example via the wireless communication device 246 and/or the wireless communication device 350.

In certain embodiments, at least one of the electronic cover plate configurations 410 is configured to display a message via the display device 320. For example, an electronic ink display 324 may display one or more messages stored in memory 370. In certain embodiments, an authorized user may be able to customize and/or select the displayed message via the external device 290 and/or the input device 330. As an example use case, the cover plate 220 may be installed to a hotel room door, and the display device 320 may display a welcome message for a period of time after the guest checks in to the hotel. As another example use case, the cover plate 220 may be installed to an apartment door to aid the management in contacting the resident.

In certain embodiments, at least one of the electronic cover plate configurations 410 is configured to remind a user that a particular item has been left behind. For example, a smart home system 292 may include sensors operable to detect the location of the user's mobile device 294. If the user attempts to exit the room to which the cover plate 220 is installed while the mobile device 294 remains in the room, the smart home system 292 may cause the electronic device 300 to indicate to the user (e.g., via the display device 320 and/or the audio output device 340) that the mobile device 294 has been left behind. Additionally or alternatively, the smart home system 292 may detect the location of other items of interest (e.g., keys, wallet) via an IoT device 293 coupled to the item of interest, and may provide similar alerts when the user attempts to leave the room without bringing the item of interest along with them.

In certain embodiments, at least one of the electronic cover plate configurations 410 is configured to provide an interface with the smart home system 292. For example, such a cover plate 220 may act as a hub or other interface with the smart home system 292 such that the user is able to perform one or more actions associated with the smart home system 292 by interfacing with the smart home system 292 via the input device 330. As one example, the user may communicate with the smart home system 292 via the cover plate 220 to cause the smart home system 292 to adjust the lights in a particular room and/or to cause the smart home system 292 to play music via the speaker 342.

In certain embodiments, at least one of the electronic cover plate configurations 410 is configured to act as a doorbell repeater that provides a chime or other indication when the doorbell rings. As one example, such a configuration may detect the ringing of the doorbell via the microphone 333. As another example, the ringing of the doorbell may be detected by an external device 290 such as the smart home system 292, and such detection may be relayed to the cover plate 220 via one of the wireless communication devices 246, 350. In certain embodiments, the cover plate 220 may be provided with BLE audio for users who are hard of hearing.

In certain embodiments, at least one of the electronic cover plate configurations 410 includes a sensor array 310 that collects information relating to the use of the facility in which the cover plate 220 is installed. Such information may, for example, be relayed to an external device 290 for analysis.

In certain embodiments, at least one of the electronic cover plate configurations 410 is operable to provide a real-time view of a scene occurring outside the room to which the cover plate 220 is installed. For example, a smart home system 292 may include a video doorbell, and may relay the video stream generated by the video doorbell to the cover plate 220 for display via the display device 320.

In certain embodiments, at least one of the electronic cover plate configurations 410 is configured to facilitate the playing of one or more games via the cover plate 220. In certain embodiments, one of the games may be a single-player game, such as Tetris. In certain embodiments, one or more of the games may be a multiplayer game, such as a crossword game. For example, a first user may play his or her turn via a cover plate 220 installed to his or her home, and a neighbor or person at a remote location may play his or her turn via a cover plate 220 installed to his or her home and/or at a mobile device 294.

In certain embodiments, at least one of the electronic cover plate configurations 410 is configured to relay a message left by a user. For example, a first user leaving the premises may input such a message via the input device 330, and a second user arriving at the premises at a later time may retrieve the message. By way of illustration, the first user may type the message using the keypad 335 or write the message using the touch screen 321/331, and the display device 320 may display the message until the message is viewed and erased by the second user. As another example, the first user may record the message into memory 370 using the microphone 333, and the display device 320 may indicate to the second user that an audio message is pending. The second user may then operate the input device 330 to retrieve the message, thereby causing the speaker 342 to play the message recorded by the first user.

In certain embodiments, at least one of the electronic cover plate configurations 410 is configured to emulate a magnetic poetry arrangement. For example, the display device 320 may display several words at random and/or from a predefined list of words, and the user may operate the touchscreen 321/331 to arrange the words to form a message.

In certain embodiments, at least one of the electronic cover plate configurations 410 is configured to display, via the display device 320, images relating to an interest of the user. For example, the interest of the user may relate to a sports team or a character in a television show or movie. Such interests may be selected by the user via the input device 330 and/or an external device 290. The images displayed may be interactive and/or dynamic. For example, the cover plate 220 may cause the display device 320 to display a loop of a character, and tapping the touchscreen 321/331 may cause the character to say a quote from the television show and/or movie.

In certain embodiments, at least one of the electronic cover plate configurations 410 is configured to display images generated by the user. For example, the user may draw an image using the touchscreen 321/331, and the display device 320 may display such an image until a new image is drawn or selected. In certain forms, such an embodiment of the cover plate 220 may emulate a Lite-Brite.

In certain embodiments, at least one of the electronic cover plate configurations 410 is configured to detect motion within the room to which the cover plate 220 is installed, for example via the motion detector 311. Such an embodiment of the cover plate 220 may, for example, be installed to a child's room. In such forms, the child's parent and/or caretaker may be alerted when the child wakes up and is active. Such an alert may, for example, be provided to the parent or caretaker's mobile device 294.

In certain embodiments, at least one of the electronic cover plate configurations 410 is configured to provide an indication regarding a schedule. For example, a cover plate 220 may display indicia relating to a child's scheduled location (e.g., school, a babysitter, sporting activity) to remind the adult of the child's current location.

In certain embodiments, at least one of the electronic cover plate configurations 410 is configured for installation in a child's bedroom. As noted above, such an embodiment may include a motion detector that detects when the child is awake and active. Additionally or alternatively, such an embodiment of the cover plate 220 may display indicia identifiable to the child to indicate to the child whether or not he or she should remain in bed. For example, the display device 320 may display first indicia (e.g., the color red) when the child should remain in bed, and may display second indicia (e.g., the color green) when the child is free to roam about. The determination of whether or not the child should remain in bed may, for example, be based upon scheduling criteria provided to the cover plate 220, such as via a mobile device 294.

In certain embodiments, at least one of the electronic cover plate configurations 410 is configured to provide a sound-activated light mode. For example, the cover plate 220 may emulate a volume unit (VU) meter.

In certain embodiments, at least one of the electronic cover plate configurations 410 is configured to aid in mitigating the risk of theft of the cover plate 220. As one example, the cover plate 220 may include a camera 318/334 operable to stream video to the smart home system 292. As another example, the cover plate 220 may include a passive infrared sensor 319, and may issue a notification when the sensor 319 indicates that a person is in the vicinity of the cover plate 220.

In certain embodiments, at least one of the electronic cover plate configurations 410 is configured to interact with the smart home system 292 to set different scenes in the home for different users. As one example, the cover plate 220 may be used by the control system 240 to distinguish between a child entering the room and an adult entering the room, for example based on the size of the heat signature detected via the passive infrared sensor 319. When the child enters the room, the smart home system 292 may set the television to the child's favorite network and turn on the lights in the child's bedroom. When the adult enters the room, the smart home system 292 may activate a stereo to play the adult's playlist in the kitchen while activating the lights in the kitchen.

In certain embodiments, at least one of the electronic cover plate configurations 410 is configured to provide audio feedback related to operation of the door hardware apparatus 100. For example, when a valid credential is presented to the credential reader 182, the control system 240 may cause the speaker 342 to play a pleasant sound stored in the memory 370. As another example, when an invalid credential is presented to the credential reader 182, the control system 240 may cause the speaker 342 to play a negative sound stored in the memory 370.

In certain embodiments, at least one of the electronic cover plate configurations 410 has features that are customizable via the input device 330. The input device 330 may serve as a user interface to adjust one or more operating parameters of the cover plate 220, the door hardware apparatus 100, or the external device 290. As one example, the user may be able to adjust a brightness of the display device 320 via the input device 330. As another example, the user may be able to adjust a sensitivity of one or more sensors (e.g., a sensor of the door hardware apparatus sensor array 190, a sensor of the electronic device sensor array 310, and/or a sensor of the smart home system 292) via the input device 330. As a further example, the input device 330 may be used to adjust the color or display features of the door handle 112, such as in embodiments in which the handle 112 includes a light source or display device.

Figure 8:
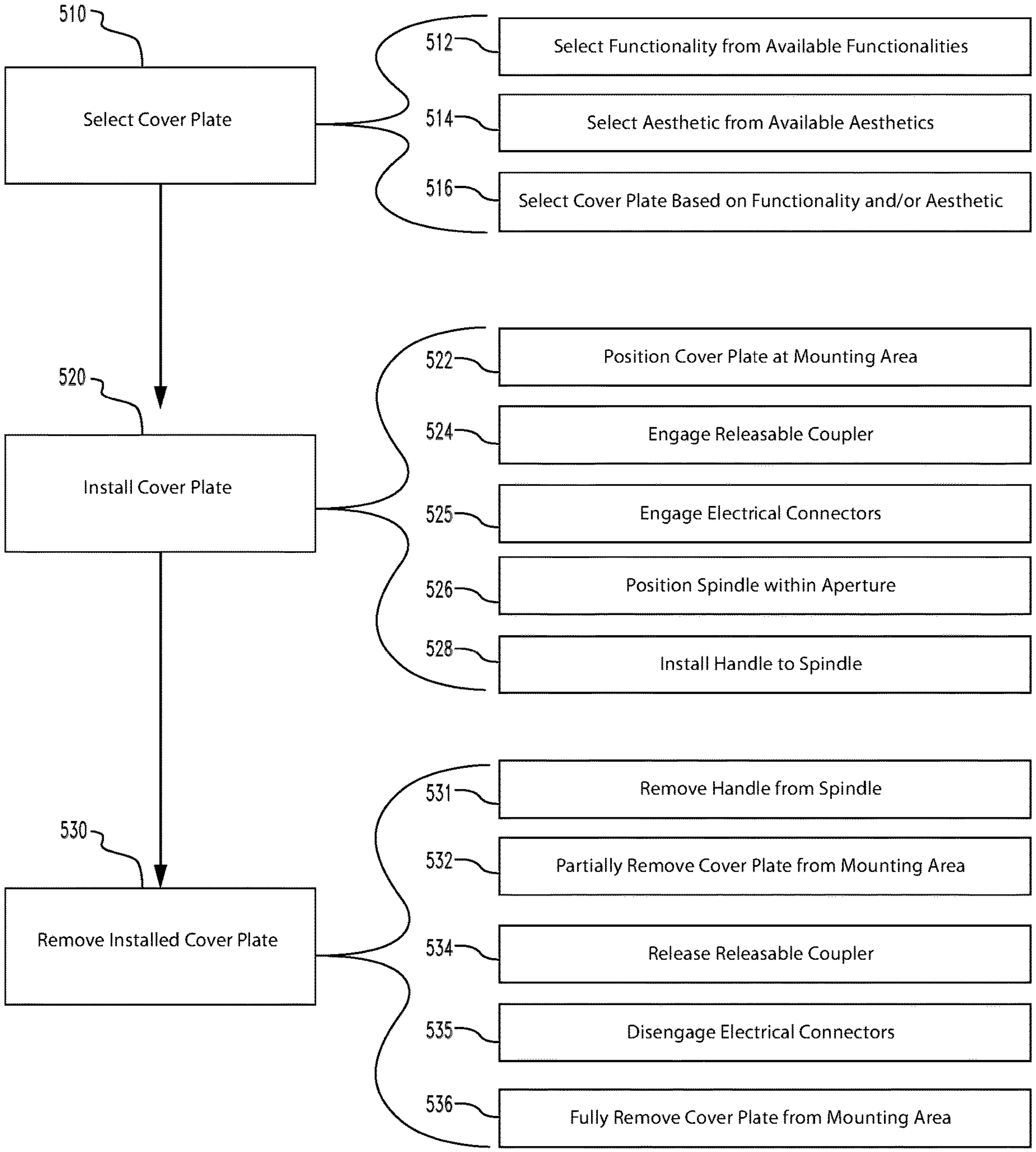
FIG. 8 is a schematic flow diagram of a process according to certain embodiments.

With additional reference to FIG. 8, illustrated therein is a process 500 according to certain embodiments, which may be utilized to customize the appearance and/or function of a rose assembly. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Additionally, while the process 500 is described herein with specific reference to the rose assembly 200 and corresponding product line 400 illustrated in FIGS. 1-7, it is to be appreciated that the process 500 and variations thereof may be performed using rose assemblies and/or product lines having additional or alternative features.

The illustrated process 500 generally involves a selection procedure 510, an installation procedure 520, and a removal procedure 530. As described herein, the selection procedure 510 generally involves selecting a cover plate 220 based upon a desired aesthetic and/or a desired functionality, the installation procedure 520 generally involves installing the selected cover plate 220 to provide the rose assembly 200 with the selected aesthetic and/or functionality, and the removal procedure 530 generally involves removing an installed cover plate 220.

In certain embodiments, the process 500 may include a selection procedure 510, which generally involves selecting a cover plate 220 to be installed to the mounting plate 210 based upon a desired aesthetic and/or a desired functionality.

In the illustrated form, the selection procedure 510 includes block 512, which generally involves selecting a desired functionality from a plurality of available functionalities. The selection procedure 510 may further include block 514, which generally involves selecting a desired aesthetic from one or more available aesthetics. The selection procedure 510 further includes block 516, which generally involves selecting a cover plate 220 based upon the selected functionality and/or the desired aesthetic. In an example implementation of the process 500, the user may select the first electronic cover plate configuration 411, and purchase or otherwise procure a cover plate 220 of the selected configuration 411.

The process 500 may include an installation procedure 520, which generally involves installing a cover plate 220 to the mounting plate 210. The cover plate installed during the installation procedure 520 may, for example, be the cover plate 220 selected in the selection procedure 510. Alternatively, the cover plate 220 installed in the installation procedure 520 may be selected, provided, and/or procured by another method.

The installation procedure 520 includes block 522, which generally includes positioning the cover plate 220 relative to the mounting area 211 such that the second surface 222 of the cover plate 220 faces the first surface 213 of the mounting plate 210. With the second surface 222 facing the mounting plate 210, the first surface 221 faces outward such that the first surface 221 and the selected aesthetic are visible to users. In embodiments in which the cover plate 220 includes a display device 320, the display device 320 may likewise face outward such that the display device 320 is visible to the user.

The installation procedure 520 further includes block 524, which generally involves engaging the cover plate coupler 232 with the mounting plate coupler 231, thereby releasably securing the cover plate 220 to the mounting area 211. In the illustrated form, block 524 includes placing the ferrous material defining the cover plate coupler 232 in proximity of the magnet defining the mounting plate coupler 231 such that magnetic attraction draws the couplers 231, 232 together.

In certain embodiments, such as those in which the electronic components of the rose assembly 200 are distributed between the cover plate 220 and the control system 240, the installation procedure 520 may further include block 525, which generally involves forming an electrical connection between the electrical connector 241 of the control system 240 and the electrical connector 301 of the electronic device 300, thereby placing the control system 240 in communication with the electronic device 300. In certain embodiments, block 526 may involve pressing the connectors 241, 301 into engagement with one another, for example by exerting a pushing force on the first region 223 while the cover plate 220 is seated in the receiving space 217. It is also contemplated that block 525 may be omitted, for example in embodiments in which the electronic device 300 lacks a connector 301.

In certain embodiments, such as those in which the cover plate 220 includes a spindle-receiving aperture 203, the installation procedure 520 may include block 526, which generally involves positioning the spindle 116 within the aperture 203. Block 526 may, for example, be performed after placing the cover plate 220 in the appropriate orientation.

In certain embodiments, the installation procedure 520 may begin with the handle 112 removed to facilitate installation of the cover plate 220. As described herein, the handle 112 may, for example, have been removed in a prior iteration of the removal procedure 530. In certain embodiments, such as those in which the handle 112 was previously removed, the installation procedure 520 may further include block 528, which generally involves installing the handle 112 to the spindle 116. With the handle 112 installed, the distal end of the shank 113 may be positioned adjacent the outward-facing surface 221 of the installed cover plate 220 to discourage or prevent removal of the cover plate 220.

The process 500 may include a removal procedure 530, which generally involves removing an installed cover plate from the mounting plate 210. For example, in a first iteration of the process 500, the removal procedure 530 may involve removing the cover plate 220 of the first configuration 411 from the mounting plate 210. In certain forms, such as those in which the handle 112 is installed and discourages or prevents removal of the cover plate 220, the removal procedure 530 may begin with block 531, which generally involves removing the handle 112 from the spindle 116, thereby freeing the installed cover plate 220 for removal.

In the illustrated form, the removal procedure 530 includes block 532, which generally involves utilizing the recessed portion 214 to partially remove the cover plate 220 from the mounting area 211. More particularly, the illustrated embodiment of block 532 involves exerting a pushing force F224 on the second region 224 of the installed cover plate 220. As illustrated in FIGS. 4 and 5, this pushing force F224 urges the second region 224 into the recessed portion 214, thereby pivoting the cover plate 220 from the installed position (FIG. 4) to a partially-removed position (FIG. 5). In the partially-removed position, the rear surface 222 of the second region 224 may abut the second surface 215 of the mounting plate 210 such that the first region 223 defines the oblique angle θ215 relative to the first surface 213 of the mounting plate 210, thereby exposing a top edge of the cover plate 220 for grasping by the user.

In the illustrated form, block 532 involves exerting a pushing force F224 to pivot the cover plate 220 to the partially-removed position illustrated in FIG. 5. In other embodiments, block 532 may involve exerting a force of another type to aid in removing the cover plate 220. For example, in embodiments in which the recessed portion 214 extends through the lip 218, block 532 may involve inserting a finger or tool through the lip 218 and exerting a pulling force to at least partially remove the cover plate 220 from the receiving space 217.

The removal procedure 530 also includes block 534, which generally involves releasing the releasable coupler 230. More particularly, block 534 involves decoupling the mounting plate coupling portion 231 from the coupling portion 232 of the installed cover plate 220. As noted above, the illustrated releasable coupler 230 is provided as a tool-less coupler that is able to be decoupled without the use of tools. In the illustrated form, the releasing of block 534 is performed automatically as a result of the pivoting of the cover plate 220 in block 532. It is also contemplated that the decoupling of block 534 may be performed independently of and/or prior to the pivoting in block 532. For example, in embodiments in which the releasable coupler 230 comprises a tool-assisted coupler (e.g., a threaded fastener), block 534 may involve releasing the coupler 230 using the appropriate tool prior to exerting the pushing force F224 in block 532.

In certain embodiments, such as those in which the cover plate 220 includes an electrical connector 301 and the control assembly 240 is present and includes a mating electrical connector 241, the removal procedure 530 also includes block 535, which generally involves disengaging the electrical connectors 241, 301 from one another. In certain embodiments, such as those in which each of the electrical connectors 241, 301 is directly mounted to the corresponding component 240, 300, block 535 may occur as a natural result of the pivoting in block 532. In other embodiments, such as those in which one or both of the electrical connectors 241, 301 is connected to the corresponding component 240, 300 via one or more wires, block 535 may be performed independently of the pivoting in block 532.

The removal procedure 530 further includes block 536, which generally involves fully removing the cover plate 220 from the mounting area 211. Block 536 may, for example, involve gripping the exposed portion of the cover plate 220 and pulling the cover plate proximally out of the receiving space 217.

As should be appreciated, one or more blocks of the process 500 may be repeated or iterated to replace the first aesthetic with a second aesthetic and/or to replace the first functionality with a second functionality. For example, the selection procedure 510 may involve selecting the second electronic cover plate configuration 412, which includes a different decorative aspect 229 and/or a different electronic device 300 in comparison to the first electronic cover plate configuration 411. In such forms, the installation procedure 520 may be performed to install a cover plate 220 of the second configuration 412 to the mounting area 211 to provide the rose assembly 200 with the aesthetic and functionality corresponding to the second configuration 412. Should the user again desire to change the aesthetic and/or functionality, the removal procedure 530 may be performed to remove the second cover plate 220.

In an example use case scenario, the rose assembly 200 may be sold to the user including an installed cover plate 220. Depending upon various factors, non-electronic cover plate configurations 420 may be less expensive to manufacture than electronic cover plate configurations 410. Accordingly, the rose assembly 200 may be sold to the user with a cover plate 220' of one of the non-electronic configurations 420. The user may then install a door hardware apparatus 100 including the rose assembly 200 to the door 90. Alternatively, the user may replace an existing rose with the newly-purchased rose assembly 200 while keeping one or more components of their existing door hardware apparatus 100.

At some point before, during, or after installation of the rose assembly 200 to the door 90, the user may decide that it would be desirable to provide the door hardware apparatus 100 with a functionality and/or aesthetic that is not provided by the original cover plate 220'. The user selects and purchases a new cover plate 220 (e.g., a cover plate 220 of the first electronic cover plate configuration 411), for example according to the selection procedure 510. In order to install the newly-purchased cover plate 220, the user first performs the removal procedure 530 to remove the cover plate 220' that was provided with the rose assembly 200 at the time of sale. After removing the existing cover plate 220', the user installs the newly-purchased cover plate 220 according to the installation procedure 520. The removal procedure 530 and the installation procedure 520 may be performed before, during, or after the installation of the rose assembly 200 to the door 90.

Figure 9:
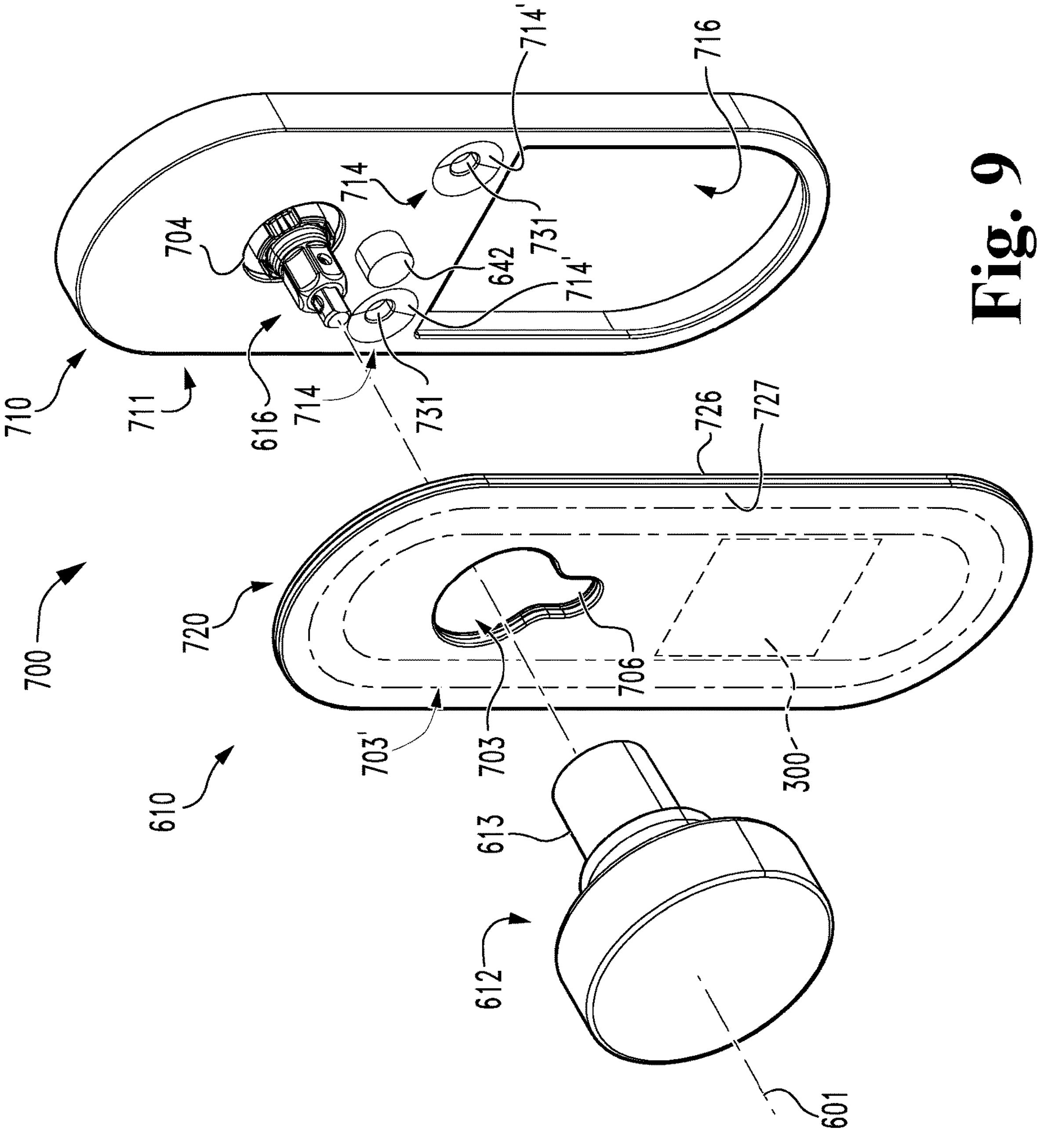
FIGS. 9 and 10 are exploded assembly views of a trim assembly according to certain embodiments.
Figure 10:
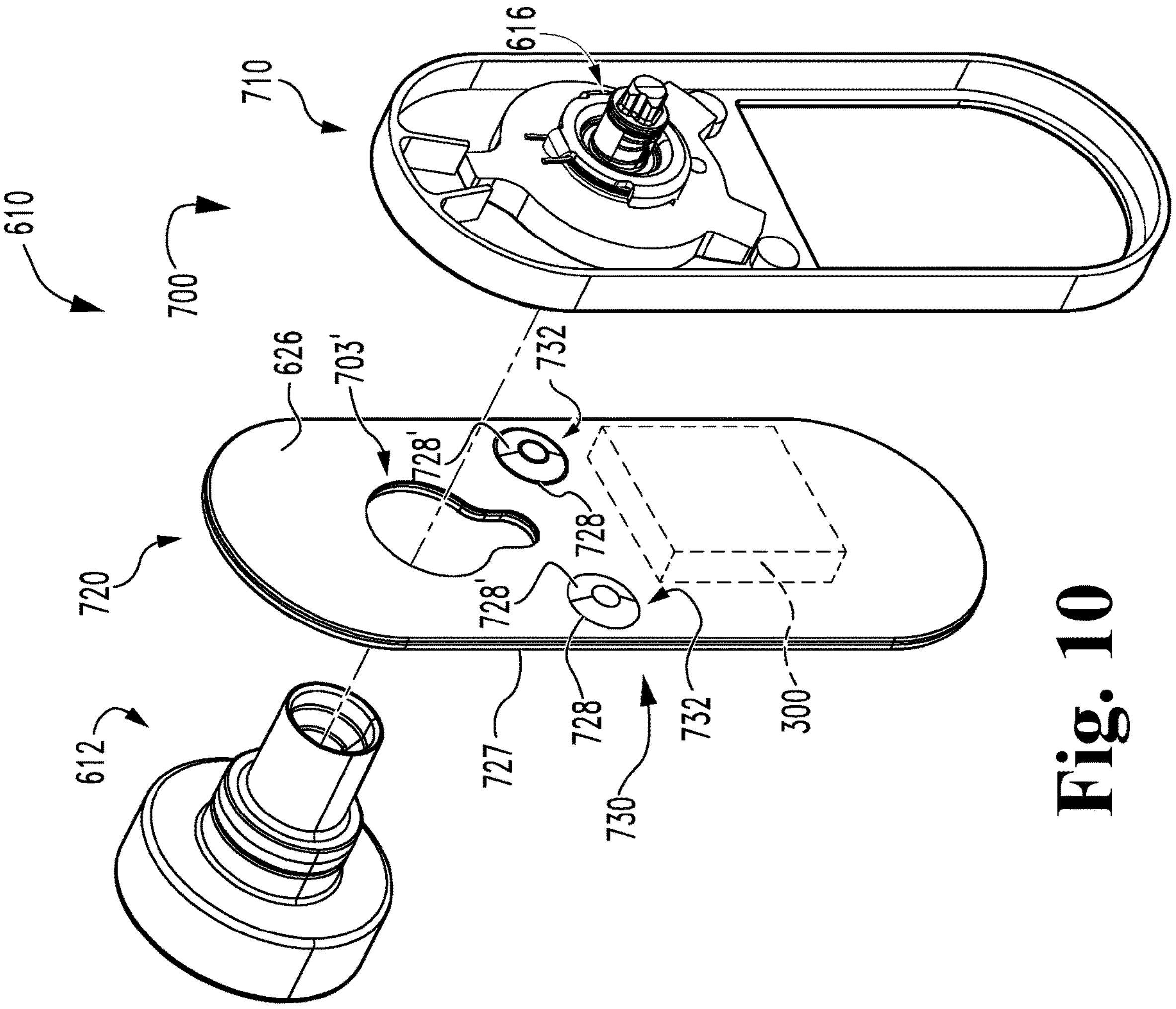

With additional reference to FIGS. 9 and 10, illustrated therein is trim assembly 610 according to certain embodiments, which includes a rose assembly 700 according to certain embodiments. The rose assembly 700 is somewhat similar to the above-described rose assembly 200, and similar reference characters are used to indicate similar elements and features. For example, the rose assembly 700 includes a mounting plate 710, a cover plate 720, and a releasable coupler 730, which respectively correspond to the mounting plate 210, cover plate 220, and releasable coupler 230 described above. Additionally, the cover plate 720 includes an electronic device 300, which may take any form described above with reference to the electronic device 300. In the interest of conciseness, the following description of the trim assembly 610 and the rose assembly 700 focuses primarily on elements and features that differ from those described above with reference to the trim assembly 110 and the rose assembly 200. It should be appreciated, however, that features described with respect to the trim assembly 110 and/or the rose assembly 200 may be provided to the trim assembly 610 and/or the rose assembly 700, and that features described with respect to the trim assembly 610 and/or the rose assembly 700 may be provided to the trim assembly 110 and/or the rose assembly 200.

The trim assembly 610 may, for example, be utilized as one or both of the trim assemblies 110, 130 in the door hardware apparatus 100. In addition to the rose assembly 700, the trim assembly 610 includes a spindle 616 and a handle 612 releasably secured to the spindle 616. The spindle 616 extends through an aperture 704 in the mounting plate 710, and in the illustrated form is rotatably mounted to the mounting plate 710. While the illustrated handle 612 is provided in the form of a knob, it is also contemplated that the handle 612 may be provided in the form of a lever.

Figure 11:
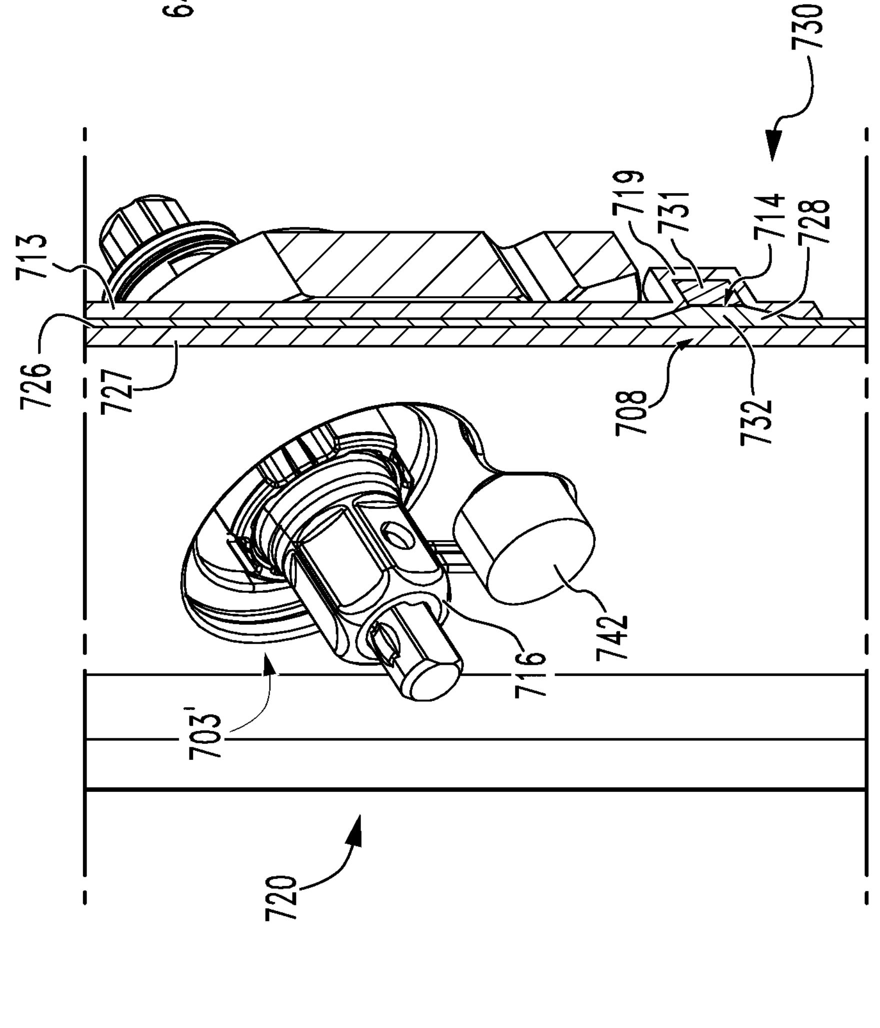
FIG. 11 is a cutaway perspective view of the trim assembly illustrated in FIGS. 9 and 10.

In the embodiment illustrated in FIGS. 10 and 11, the spindle 616 and the lock actuator 642 extend through a single aperture 703' formed in the cover plate 720. The single aperture 703' is provided in the form of a keyhole shaped aperture, and includes a spindle-receiving region 703 and an actuator receiving region 706 that depends downward from the spindle-receiving region 703. It is also contemplated that the spindle-receiving region 703 and the actuator-receiving region 706 may be formed as distinct apertures, such as described above with reference to the apertures 203, 206 of the cover plate 220.

In the illustrated embodiment, no control assembly is mounted to the mounting plate 710. Instead, the electronics of the rose assembly 700 are consolidated in the cover plate 720. As such, the electronic device 300 of the cover plate 720 may lack the electrical connector 301. It is also contemplated that the rose assembly 700 may include a control assembly mounted within the mounting plate 710. Such a control assembly may include an electrical connector corresponding to the electrical connector 241. In such forms, the electronic device 300 of the cover plate 720 may include an electrical connector 301.

In the illustrated form, the mounting plate 710 defines a mounting location 711 having an outer perimeter that generally conforms to the outer perimeter of the cover plate 720. However, the illustrated mounting plate 710 does not include a lip such as the lip 218. As such, the mounting plate 710 may not necessarily be considered to define the mounting location 711 as a receiving space. The mounting plate 710 further defines at least one recessed portion 714 that facilitates the mounting and/or removal of the cover plate 720 to the mounting location 711, and in the illustrated form defines a pair of laterally-offset recessed portions 714. As described herein, the recessed portions 714 cooperate with protrusions 728 of the cover plate 720 to aid in aligning the cover plate 720 for installation to the mounting area 711. Thus, the recessed portions 714 may be considered to define alignment features of the mounting plate 710.

The cover plate 720 includes at least one protrusion 728 configured to be received in the at least one recessed portion 714 of the mounting plate 710, and in the illustrated form includes a pair of protrusions 728 corresponding to the pair of recessed portions 714. In the illustrated form, each recessed portion 714 has a female frustoconical geometry, and each protrusion 728 has a male frustoconical geometry configured to mate with the female frustoconical geometry of the recessed portion(s) 714. It is also contemplated that the recessed portion(s) 714 and/or the protrusion(s) 728 may take another form. For example, a recessed portion 714 may be provided with a curved concave geometry, and the corresponding protrusion 728 may be provided with a correspondingly curved convex geometry.

Figure 12:
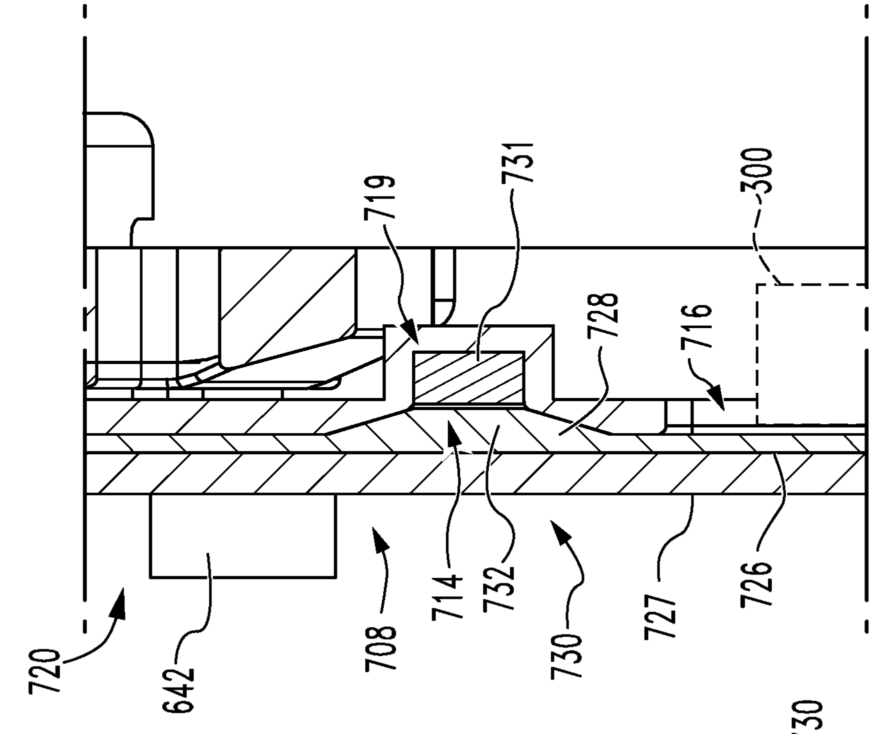
FIG. 12 is a cross-sectional view of a portion of the trim assembly illustrated in FIGS. 9 and 10.

With additional reference to FIGS. 11 and 12, the recessed portion(s) 714 and the protrusion(s) 728 taken together may be considered to define an alignment mechanism 708 of the rose assembly 700. In the illustrated embodiment, each of the recessed portions 714 is provided in the mounting plate 710, and each of the protrusions 728 is provided on the cover plate 720. It is also contemplated that at least one recess 714 may be formed in the cover plate 720, and a corresponding at least one protrusion 728 may be formed on the mounting plate 710.

In the illustrated embodiment, each recessed portion 714 defines a pocket 719 in which a magnet defining the mounting plate coupler 731 is seated. The magnet may, for example, be secured in the pocket 719 using adhesives. It is also contemplated that the recessed portions 714 may not necessarily define pockets 719, and that the magnets 731 may instead be mounted behind the recessed portions 714. In the illustrated form, the cover plate coupler 732 is defined by the ferrous material of which the protrusions 728 are formed. In certain embodiments, such as those in which the support substrate 726 is formed of a ferrous material, the protrusions 728 may be integrally formed with the support substrate 726. Alternatively, the protrusions 728 may be mounted to the support substrate 726, and/or may include magnets that define the cover plate coupler(s) 732. Moreover, it is also contemplated that the cover plate coupler 732 may include a magnet, and that the mounting plate coupler 731 may include a ferrous material and/or a magnet.

During installation of the cover plate 720 to the mounting plate 710, the alignment mechanism 708 facilitates the positioning of the cover plate 720 in the appropriate location and orientation relative to the mounting area 711. More particularly, the recessed portions 714 and protrusions 728 are positioned such that when the protrusions 728 are received in the recessed portions 714, the spindle-receiving region 703 of the aperture 703' is aligned with the aperture 704 of the mounting plate 710 such that the spindle 616 can extend through the aligned apertures 703', 704. Similarly, the actuator-receiving region 706 is aligned with a corresponding aperture formed in the mounting plate 710 such that the lock actuator 642 is operable to extend through the aligned apertures.

In the illustrated form, each recessed portion 714 comprises a ramped surface 714', and each protrusion 728 comprises a corresponding ramped surface 728'. The ramped surfaces 714', 728' that partially define the recessed portions 714 and the protrusions 728 may serve to guide the cover plate 720 into its aligned position. For example, should the position of the cover plate 720 be slightly off true, the protrusions 728 may partially enter the recessed portions 714, and the ramped surfaces 714', 728' may aid the installer in more fully aligning the protrusions 728 for full insertion into the recessed portions 714. In embodiments in which the releasable coupler 730 is provided in the form of a magnetic coupler, the magnetic forces generated between the coupling portions 731, 732 may draw the protrusions 728 deeper into the recessed portions 714 as the releasable coupler 730 engages.

Upon installation of the cover plate 720 to the mounting plate 710, the alignment mechanism 708 also aids in retaining the cover plate 720 in the proper location and orientation relative to the mounting area 711. More particularly, when the cover plate 720 is mounted to the mounting area 711, the protrusions 728 engage the recessed portions 714 to discourage movement of the cover plate 720 in directions transverse to the primary axis 601. When the handle 612 is installed, the shank 613 of the handle 612 may face the cover plate 720 and limit movement of the cover plate 720 in a proximal direction along the primary axis 601. Should a user urge the cover plate 720 in a direction transverse to the primary axis 601, the engaged tapered surfaces of the recessed portions 714 and the protrusions 728 will urge the cover plate 720 proximally away from the mounting plate 710. This proximal urging may drive the front side of the cover plate 720 into engagement with the distal end of the shank 613, thereby preventing the protrusions 728 from fully exiting the recessed portions 714. In such forms, the recessed portions 714 may aid in preventing rotation of the cover plate 720 about the spindle 616.

Figure 13:
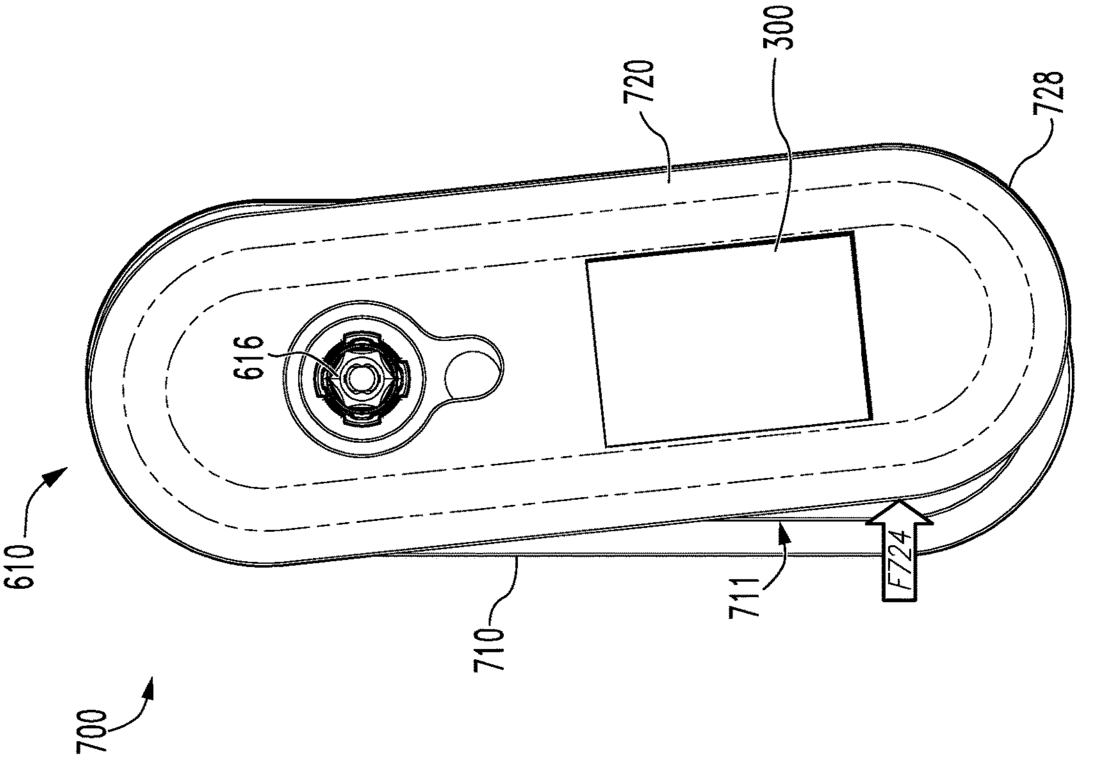
FIG. 13 is a plan view of the trim assembly illustrated in FIGS. 9 and 10 in a partially disassembled state.

With additional reference to FIG. 13, the engagement of the recessed portions 714 with the protrusions 728 may aid the removal of the cover plate 720 from the mounting plate 710. For example, should a user urge the cover plate 720 in a direction transverse to the primary axis 601 (e.g., by exerting a pushing force F724 on one edge of the cover plate 720), the engaged tapered surfaces of the recessed portions 714 and the protrusions 728 will urge the cover plate 720 proximally away from the mounting plate 710 as described above. This proximal movement moves the ferrous material of the cover plate coupler 732 away from the magnet of the mounting plate coupler 731, thereby reducing the magnetic attraction between the two and facilitating removal of the cover plate 720 from the mounting plate 710.

In certain embodiments, the rose assembly 700 may be provided with a corresponding product line in a manner analogous to that described above with the product line 400 corresponding to the rose assembly 200. While an example implementation of the above-described process 500 was described with reference to the rose assembly 200 and corresponding product line 400, it should be appreciated that the selection, installation, and/or removal of the cover plate 720 may proceed along the lines set forth above with reference to the process 500. For example, the selection procedure 510 may be performed to select the cover plate 720 from a plurality of cover plate configurations, the installation procedure 520 may be performed to install the selected cover plate 720 to the mounting plate 710, and the removal procedure 530 may be performed to remove the cover plate 720 from the mounting plate. In the interest of conciseness, the following description of a second implementation of the process 500 focuses primarily on those blocks of the process 500 that differ from the above-described implementation of the process 500 (i.e., the implementation using the rose assembly 200 and the product line 400).

As noted above, the electronic features of the illustrated embodiment of a rose assembly 700 are consolidated within the cover plate 720. As such, the electronic device 300 need not include an electrical connector 301. With the electrical connector 301 and/or the mounting-plate-mounted control assembly 240 omitted from the rose assembly 700, the engaging of block 525 and the disengaging of block 535 may likewise be omitted from the process 500.

In block 524, the engaging of the releasable coupler 730 may involve utilizing the above-described alignment mechanism 708 defined by the recessed portions 714 and the protrusions 728 to align the cover plate 720 in the proper orientation relative to the mounting area 711. Additionally, in embodiments in which the releasable coupler 730 is provided in the form of a magnetic coupler, the magnetic forces generated between the coupling portions 731, 732 may draw the protrusions 728 deeper into the recessed portions 714 to further aid in the alignment and coupling of the cover plate 720 with the mounting plate 710.

In block 532, the partial removal of the cover plate 720 may involve exerting a torque or force (e.g., a force F724) to urge the cover plate 720 to pivot about the spindle 616. As noted above, such urging causes the ramped surfaces 714', 728' of the recessed portions 714 and protrusions 728 to urge the cover plate 720 proximally away from the mounting plate 710. The cover plate 720 may thereby pivot to an orientation in which the top edge and/or the bottom edge is positioned outside the footprint of the mounting area 711. As a result, the exposed edge(s) 729 may be grasped and pulled to fully remove the cover plate 720 from the mounting plate 710 in the removal of block 536.

Figure 14:
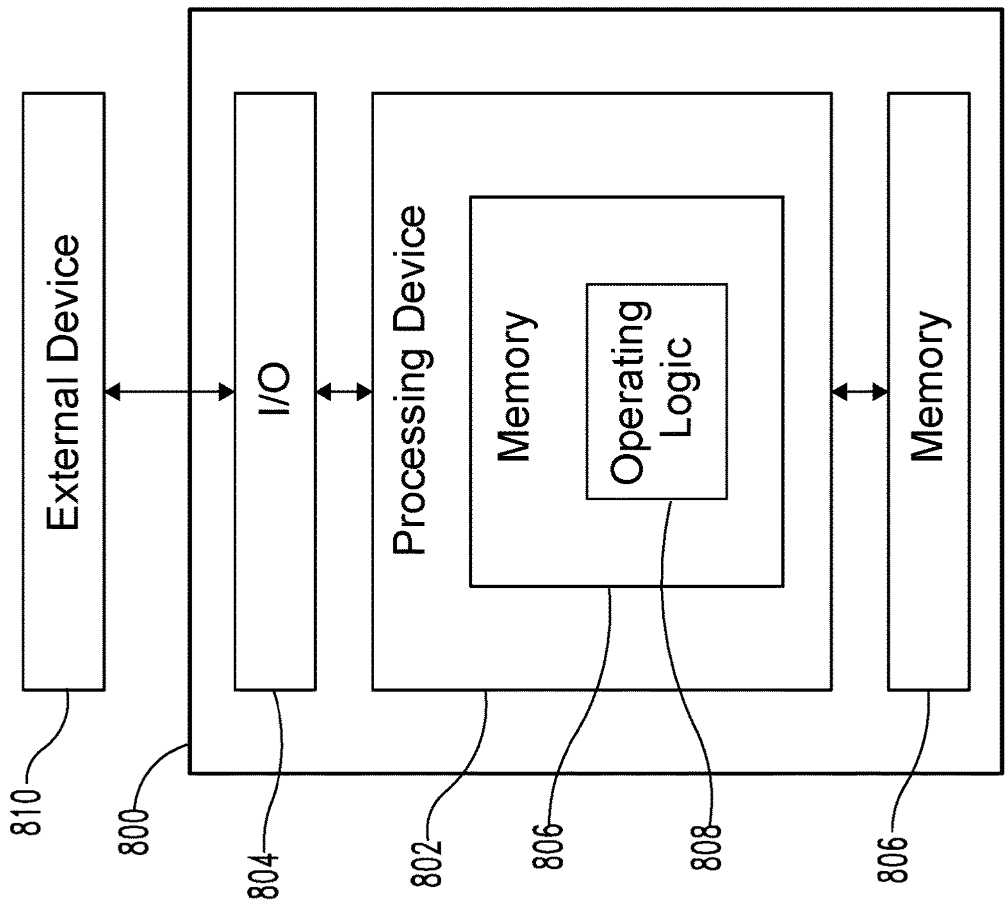
FIG. 14 is a schematic block diagram of a computing device according to certain embodiments.

With additional reference to FIG. 14, illustrated therein is a simplified block diagram of at least one embodiment of a computing device 800. The illustrative computing device 800 depicts at least one embodiment of a control system, controller, or electronic device that may be utilized in connection with the control system 240, controllers 242, 360, and/or electronic device 300 illustrated in FIGS. 1-13.

Depending on the particular embodiment, the computing device 800 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 800 includes a processing device 802 that executes algorithms and/or processes data in accordance with operating logic 808, an input/output device 804 that enables communication between the computing device 800 and one or more external devices 810, and memory 806 which stores, for example, data received from the external device 810 via the input/output device 804.

The input/output device 804 allows the computing device 800 to communicate with the external device 810. For example, the input/output device 804 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 800. The input/output device 804 may include hardware, software, and/or firmware suitable for performing the techniques described herein.

The external device 810 may be any type of device that allows data to be inputted or outputted from the computing device 800. For example, in various embodiments, the external device 810 may be embodied as the electronic component(s) 180, the control system 240, the external device 290, or the electronic device 300. Further, in some embodiments, the external device 810 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 810 may be integrated into the computing device 800.

The processing device 802 may be embodied as any type of processor(s) capable of performing the functions described herein. In particular, the processing device 802 may be embodied as one or more single or multi-core processors, microcontrollers, or other processor or processing/controlling circuits. For example, in some embodiments, the processing device 802 may include or be embodied as an arithmetic logic unit (ALU), central processing unit (CPU), digital signal processor (DSP), and/or another suitable processor(s). The processing device 802 may be a programmable type, a dedicated hardwired state machine, or a combination thereof. Processing devices 802 with multiple processing units may utilize distributed, pipelined, and/or parallel processing in various embodiments. Further, the processing device 802 may be dedicated to performance of just the operations described herein, or may be utilized in one or more additional applications. In the illustrative embodiment, the processing device 802 is of a programmable variety that executes algorithms and/or processes data in accordance with operating logic 808 as defined by programming instructions (such as software or firmware) stored in memory 806. Additionally or alternatively, the operating logic 808 for processing device 802 may be at least partially defined by hardwired logic or other hardware. Further, the processing device 802 may include one or more components of any type suitable to process the signals received from input/output device 804 or from other components or devices and to provide desired output signals. Such components may include digital circuitry, analog circuitry, or a combination thereof.

The memory 806 may be of one or more types of non-transitory computer-readable media, such as a solid-state memory, electromagnetic memory, optical memory, or a combination thereof. Furthermore, the memory 806 may be volatile and/or nonvolatile and, in some embodiments, some or all of the memory 806 may be of a portable variety, such as a disk, tape, memory stick, cartridge, and/or other suitable portable memory. In operation, the memory 806 may store various data and software used during operation of the computing device 800 such as operating systems, applications, programs, libraries, and drivers. It should be appreciated that the memory 806 may store data that is manipulated by the operating logic 808 of processing device 802, such as, for example, data representative of signals received from and/or sent to the input/output device 804 in addition to or in lieu of storing programming instructions defining operating logic 808. As illustrated, the memory 806 may be included with the processing device 802 and/or coupled to the processing device 802 depending on the particular embodiment. For example, in some embodiments, the processing device 802, the memory 806, and/or other components of the computing device 800 may form a portion of a system-on-a-chip (SoC) and be incorporated on a single integrated circuit chip.

In some embodiments, various components of the computing device 800 (e.g., the processing device 802 and the memory 806) may be communicatively coupled via an input/output subsystem, which may be embodied as circuitry and/or components to facilitate input/output operations with the processing device 802, the memory 806, and other components of the computing device 800. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 800 may include other or additional components, such as those commonly found in a typical computing device (e.g., various input/output devices and/or other components), in other embodiments. It should be further appreciated that one or more of the components of the computing device 800 described herein may be distributed across multiple computing devices. In other words, the techniques described herein may be employed by a computing system that includes one or more computing devices. Additionally, although only a single processing device 802, I/O device 804, and memory 806 are illustratively shown in FIG. 14, it should be appreciated that a particular computing device 800 may include multiple processing devices 802, I/O devices 804, and/or memories 806 in other embodiments. Further, in some embodiments, more than one external device 810 may be in communication with the computing device 800.

As should be appreciated from the foregoing, the systems and methods described herein may provide one or more advantages over the existing art. For example, the systems and methods described herein may facilitate the customization of a rose assembly and/or a door hardware apparatus including such a rose assembly. In certain embodiments, the systems and methods described herein may provide for such customization without the use of tools, thereby further facilitating the customization process.

Certain embodiments of the present application relate to a cover plate configured for use with a mounting plate and a control system, the cover plate having a front side and a rear side opposite the front side, the cover plate comprising: a support substrate comprising an opening sized and shaped to receive a spindle of a door hardware apparatus associated with the rose assembly; a cover plate coupler configured to releasably couple with a mounting plate coupler of the mounting plate; and an electronic device mounted to the support substrate, the electronic device comprising: a first electrical connector accessible from the rear side of the cover plate and configured for electrical connection with a second electrical connector of the control system; and an electronic component electrically connected with the first electrical connector such that the electronic component is in communication with the first electrical connector.

In certain embodiments, the electronic device further comprises a non-transitory computer readable medium including information relating to the electronic component; and wherein the non-transitory computer readable medium is electrically connected with the first electrical connector such that the non-transitory computer readable medium is operable to transmit the information via the first electrical connector.

In certain embodiments, the support substrate is formed of a ferrous material; and wherein the cover plate coupler is defined by the ferrous material of the support substrate.

In certain embodiments, the cover plate coupler comprises a magnet mounted to the support substrate.

In certain embodiments, the electronic component is operable to receive electrical power via the first electrical connector.

In certain embodiments, the cover plate further comprises a decorative layer mounted to the support substrate on the front side of the cover plate.

In certain embodiments, the cover plate has a maximum thickness of one centimeter or less.

In certain embodiments, the electronic device comprises at least one additional electronic component electrically connected with the first electrical connector.

In certain embodiments, the electronic component comprises a sensor array including at least one sensor operable to transmit information relating to a sensed condition via the first electrical connector.

In certain embodiments, the electronic component comprises an electronic display device. In certain embodiments, the electronic display device is configured to display information received via the first electrical connector.

In certain embodiments, the electronic component comprises a user input device configured to receive a user input and to transmit information relating to the user input. In certain embodiments, the user input device is configured to transmit the information relating to the user input via the first electrical connector.

In certain embodiments, the electronic component comprises an audio output device configured to generate an audio output. In certain embodiments, the audio output device is configured to generate the audio output based on information received via the first electrical connector.

In certain embodiments, the electronic component comprises a wireless communication device configured to facilitate wireless communication with an external device. In certain embodiments, the wireless communication device is configured to facilitate wireless communication between the control assembly and the external device.

Certain embodiments of the present application relate to a rose assembly comprising the cover plate, and further comprising: the mounting plate, wherein the mounting plate defines a mounting area to which the cover plate is mounted; and the control assembly, wherein the control assembly is mounted to the mounting plate, wherein the control assembly includes the second electrical connector, and wherein the first electrical connector is engaged with the second electrical connector such that the control assembly is in communication with the electronic device.

In certain embodiments, the control assembly includes a controller; and wherein the controller is in communication with the electronic component via the engaged first and second electrical connectors.

Certain embodiments of the present application relate to a rose assembly configured for mounting to a door, the rose assembly comprising: a mounting plate defining a mounting area; a control system mounted to the mounting plate, the control system comprising: a controller; and a control system electrical connector electrically connected with the controller; a cover plate mounted to the mounting area, the cover plate comprising: an electronic component; and a cover plate electrical connector electrically connected with the electronic component; and a releasable coupler selectively maintaining the cover plate at the mounting area; wherein the control system electrical connector is releasably engaged with the cover plate electrical connector such that the controller is in communication with the electronic component.

In certain embodiments, the mounting area includes a primary receiving space and a recessed portion; wherein a first region of the cover plate covers the primary receiving space and a second region of the cover plate covers the recessed portion; and wherein a pressing force applied to the second region of the cover plate pivots the cover plate such that the first region of the cover plate exits the mounting area.

In certain embodiments, the cover plate further comprises a non-transitory computer readable medium including information relating to the electronic component; and wherein the controller is in communication with the non-transitory computer readable medium and is configured to operate the electronic component based upon the information relating to the electronic component.

In certain embodiments, the releasable coupler comprises a magnet.

Certain embodiments of the present application relate to a method, comprising: installing a cover plate to a door hardware apparatus; wherein the cover plate comprises: a support substrate defining an aperture; an electronic device mounted to the support substrate, the electronic device comprising a first electronic component; and a first coupling portion; wherein the door hardware apparatus comprises: a mounting plate defining a mounting area; a spindle extending through the mounting plate; and a second coupling portion operable to releasably couple with the first coupling portion; and wherein installing the cover plate to the door hardware apparatus comprises: inserting the spindle into the aperture; positioning the cover plate at the mounting area; and releasably coupling the first coupling portion with the second coupling portion, thereby releasably securing the cover plate to the mounting area.

In certain embodiments, the cover plate further comprises a first electrical connector connected with the first electronic component; wherein the door hardware apparatus further comprises a second electrical connector operable to mate with the first electrical connector, and a second electronic component connected with the second electrical connector; and wherein installing the cover plate to the door hardware apparatus further comprises engaging the first electrical connector with the second electrical connector, thereby placing the first electronic component in communication with the second electronic component.

In certain embodiments, the method further comprises removing the cover plate from the door hardware apparatus; wherein the mounting plate further defines a recessed portion; wherein a first region of the cover plate is offset from the recessed portion and a second region of the cover plate covers the recessed portion; and wherein removing the cover plate from the door hardware apparatus comprises exerting a pushing force on the second region, thereby pivoting the cover plate to a position in which at least a portion of the first region exits the mounting area. In certain embodiments, the pushing force is exerted in a distal direction defined by a rotational axis of the spindle.

In certain embodiments, the door hardware apparatus further comprises: a latch mechanism operably connected with the spindle; and a lock mechanism operable to selectively prevent the spindle from actuating the latch mechanism; and wherein the method further comprises inserting a lock actuator through the cover plate and the mounting plate to engage the lock actuator with the lock mechanism.

Certain embodiments of the present application relate to a product line, comprising: a plurality of cover plates including a first cover plate and a second cover plate, wherein each cover plate comprises: a support substrate defining an aperture; a cover plate coupling portion; and a cover plate electronic component mounted to the support substrate, the cover plate electronic component operable to provide a capability; wherein the cover plate electronic component of the first cover plate and the cover plate electronic component of the second cover plate differ in capability; and a door hardware apparatus configured for use with each of the plurality of cover plates, the door hardware apparatus comprising: a mounting plate defining a mounting area sized and shaped for engagement with each cover plate, the mounting plate including a mounting plate coupling portion configured to releasably engage with the cover plate coupling portion of each cover plate; and a spindle operable to extend through the aperture of each support substrate; wherein installation of the first cover plate to the door hardware apparatus provides the door hardware apparatus with the capability provided by the cover plate electronic component of the first cover plate; and wherein installation of the second cover plate to the door hardware apparatus provides the door hardware apparatus with the capability provided by the cover plate electronic component of the second cover plate.

In certain embodiments, the cover plate further comprises a cover plate electrical connector connected with the cover plate electronic component; and wherein the door hardware apparatus further comprises: a door hardware electronic component; and a door hardware electrical connector operable to engage the cover plate electrical connector to place the door hardware electronic component in communication with the cover plate electronic component.

In certain embodiments, each cover plate has a length, a width less than the length, and a thickness less than the width; wherein each cover plate has the same length and the same width; and wherein the thickness of each cover plate is less than one centimeter.

In certain embodiments, the first cover plate has a first outer perimeter; wherein the second cover plate has a second outer perimeter; and wherein the first outer perimeter matches the second outer perimeter.

In certain embodiments, each cover plate further comprises a decorative layer mounted to the support substrate on a front side of the cover plate; and wherein the decorative layer of the first cover plate and the decorative layer of the second cover plate differ in at least one ornamental aspect.

In certain embodiments, the mounting plate further comprises a lip that circumferentially surrounds a receiving space of the mounting area.

Certain embodiments of the present application relate to a cover plate configured for use with a mounting plate, the cover plate comprising: a support substrate comprising an opening sized and shaped to receive a spindle of a door hardware apparatus; a protrusion projecting from a rear side of the cover plate, the protrusion comprising at least one of a ferrous material or a magnet; an electronic device mounted to the support substrate, the electronic device comprising: a power supply; an electronic component having a capability; a non-transitory computer readable medium including information relating to the electronic component; and a controller connected with the power supply, the electronic component, and the non-transitory computer readable medium; wherein the controller is configured to operate the electronic component using the information relating to the electronic component to provide the cover plate with the capability.

In certain embodiments, the protrusion is frustoconical.

In certain embodiments, the cover plate further comprises a second protrusion projecting from a rear side of the cover plate, the second protrusion comprising at least one of a ferrous material or a magnet.

In certain embodiments, an outer perimeter of the cover plate comprises: a pair of parallel edges; a first curved edge connecting first ends of the pair of parallel edges; and a second curved edge connecting second ends of the pair of parallel edges.

In certain embodiments, the cover plate further comprises a decorative layer mounted to the support substrate on a front side of the cover plate opposite the rear side of the cover plate.

In certain embodiments, the electronic device further comprises an electrical connector connected with the electronic component and configured to engage a second electrical connector of a control assembly installed to the mounting plate.

Certain embodiments of the present application relate to a rose assembly comprising the cover plate, and further comprising the mounting plate, wherein the mounting plate comprises: a mounting area to which the cover plate is mounted; a recessed portion in which the protrusion is seated; and a magnet aligned with the recessed portion, wherein magnetic forces between the protrusion and the magnet releasably couple the cover plate to the mounting area.

Certain embodiments of the present application relate to a rose assembly, comprising: a mounting plate configured for mounting to a door, the mounting plate defining a mounting area, the mounting plate comprising a first coupling portion; a cover plate mounted to the mounting area of the mounting plate, the cover plate comprising: a support substrate; an electronic device mounted to the support substrate; and a second coupling portion engaged with the first coupling portion and retaining the cover plate at the mounting area; an alignment device comprising: a protrusion defined by one of the mounting plate or the cover plate; and a recessed portion defined by the other of the mounting plate or the cover plate; wherein the protrusion is received in the recessed portion.

In certain embodiments, at least one of the first coupling portion or the second coupling portion comprises a magnet; and wherein the other of the first coupling portion or the second coupling portion is configured to be magnetically attracted to the magnet.

In certain embodiments, the magnet is mounted within a pocket of the recessed portion.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A product line, comprising:

a plurality of cover plates including a first cover plate and a second cover plate, wherein each cover plate comprises:

a support substrate defining an aperture;

a cover plate coupling portion; and a cover plate electronic component mounted to the support substrate, the cover plate electronic component operable to provide a capability;

wherein the cover plate electronic component of the first cover plate and the cover plate electronic component of the second cover plate differ in capability; and a door hardware apparatus configured for use with each of the plurality of cover plates, the door hardware apparatus comprising:

a mounting plate defining a mounting area sized and shaped for engagement with each cover plate, the mounting plate including a mounting plate coupling portion configured to releasably engage with the cover plate coupling portion of each cover plate; and a spindle operable to extend through the aperture of each support substrate;

wherein installation of the first cover plate to the door hardware apparatus provides the door hardware apparatus with the capability provided by the cover plate electronic component of the first cover plate; and wherein installation of the second cover plate to the door hardware apparatus provides the door hardware apparatus with the capability provided by the cover plate electronic component of the second cover plate.

2. The product line of claim 1, wherein the cover plate further comprises a cover plate electrical connector connected with the cover plate electronic component; and wherein the door hardware apparatus further comprises:

a door hardware electronic component; and a door hardware electrical connector operable to engage the cover plate electrical connector to place the door hardware electronic component in communication with the cover plate electronic component.

3. The product line of claim 1, wherein each cover plate has a length, a width less than the length, and a thickness less than the width;

wherein each cover plate has the same length and the same width; and wherein the thickness of each cover plate is less than one centimeter.

4. The product line of claim 1, wherein the first cover plate has a first outer perimeter;

wherein the second cover plate has a second outer perimeter; and wherein the first outer perimeter matches the second outer perimeter.

5. The product line of claim 1, wherein each cover plate further comprises a decorative layer mounted to the support substrate on a front side of the cover plate; and wherein the decorative layer of the first cover plate and the decorative layer of the second cover plate differ in at least one ornamental aspect.

6. The product line of claim 1, wherein the mounting plate further comprises a lip that circumferentially surrounds a receiving space of the mounting area.

7. A rose assembly, comprising:

a mounting plate configured for mounting to a door, the mounting plate defining a mounting area, the mounting plate comprising a first coupling portion;

a cover plate mounted to the mounting area of the mounting plate, the cover plate comprising:

a support substrate;

an electronic device mounted to the support substrate; and a second coupling portion engaged with the first coupling portion to retain the cover plate at the mounting area; and an alignment device comprising:

a protrusion defined by one of the mounting plate or the cover plate; and a recessed portion defined by the other of the mounting plate or the cover plate;

wherein the protrusion is received in the recessed portion.

8. The rose assembly of claim 7, wherein at least one of the first coupling portion or the second coupling portion comprises a magnet; and wherein the other of the first coupling portion or the second coupling portion is configured to be magnetically attracted to the magnet.

9. The rose assembly of claim 8, wherein the magnet is mounted within a pocket of the recessed portion.

10. The rose assembly of claim 7, wherein the first coupling portion is configured to be disengaged from the second coupling portion without the use of a tool to thereby permit separation of the cover plate and the mounting plate.

11. The rose assembly of claim 7, further comprising a control system mounted to the mounting plate, the control system comprising:

a controller; and a control system electrical connector electrically connected with the controller;

wherein the cover plate further comprises a cover plate electrical connector electrically connected with the electronic device; and wherein the control system electrical connector is releasably engaged with the cover plate electrical connector such that the controller is in communication with the electronic device.

12. The rose assembly of claim 11, wherein the cover plate further comprises a non-transitory computer readable medium including information relating to the electronic device; and wherein the controller is in communication with the non-transitory computer readable medium and is configured to operate the electronic device.

13. The rose assembly of claim 11, wherein the electronic device comprises at least one of an electronic display device or an audio output device.

14. The rose assembly of claim 11, wherein the electronic device comprises a user input device configured to receive a user input and to transmit information relating to the user input.

15. The rose assembly of claim 11, wherein the electronic device comprises a wireless communication device configured to facilitate wireless communication with an external device.

16. A method, comprising:

installing a cover plate to a door hardware apparatus;

wherein the cover plate comprises:

a support substrate defining an aperture;

an electronic device mounted to the support substrate, the electronic device comprising a first electronic component; and a first coupling portion;

wherein the door hardware apparatus comprises:

a mounting plate defining a mounting area;

a spindle extending through the mounting plate; and a second coupling portion operable to releasably couple with the first coupling portion; and wherein installing the cover plate to the door hardware apparatus comprises:

inserting the spindle into the aperture;

positioning the cover plate at the mounting area; and releasably coupling the first coupling portion with the second coupling portion, thereby releasably securing the cover plate to the mounting area.

17. The method of claim 16, wherein the cover plate further comprises a first electrical connector connected with the first electronic component;

wherein the door hardware apparatus further comprises a second electrical connector operable to mate with the first electrical connector, and a second electronic component connected with the second electrical connector; and wherein installing the cover plate to the door hardware apparatus further comprises engaging the first electrical connector with the second electrical connector, thereby placing the first electronic component in communication with the second electronic component.

18. The method of claim 16, further comprising removing the cover plate from the door hardware apparatus;

wherein the mounting plate further defines a recessed portion;

wherein a first region of the cover plate is offset from the recessed portion and a second region of the cover plate covers the recessed portion; and wherein removing the cover plate from the door hardware apparatus comprises exerting a pushing force on the second region, thereby pivoting the cover plate to a position in which at least a portion of the first region exits the mounting area.

19. The method of claim 18, wherein the pushing force is exerted in a distal direction defined by a rotational axis of the spindle.

20. The method of claim 16, wherein the door hardware apparatus further comprises:

a latch mechanism operably connected with the spindle; and a lock mechanism operable to selectively prevent the spindle from actuating the latch mechanism; and wherein the method further comprises inserting a lock actuator through the cover plate and the mounting plate to engage the lock actuator with the lock mechanism.

* * * * *